US007146390B2

(12) United States Patent
Garthwaite

(10) Patent No.: US 7,146,390 B2
(45) Date of Patent: Dec. 5, 2006

(54) STAGING THE PROCESSING OF REMEMBERED-SET ENTRIES AS PART OF COLLECTION BASED ON THE TRAIN ALGORITHM

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 490 days.

(21) Appl. No.: 10/372,905

(22) Filed: Feb. 24, 2003

(65) Prior Publication Data

US 2004/0167946 A1 Aug. 26, 2004

(51) Int. Cl.
G06F 12/00 (2006.01)

(52) U.S. Cl. ............... 707/206; 707/205; 711/173; 711/209

(58) Field of Classification Search ......... 707/1–10, 707/100–104.1, 200–206; 711/170–173, 711/200–209; 719/312–315
See application file for complete search history.

(56) References Cited

U.S. PATENT DOCUMENTS

| 4,724,521 | A | 2/1988 | Carron et al. |
|---|---|---|---|
| 4,797,810 | A | 1/1989 | McEntee et al. |
| 4,912,629 | A | 3/1990 | Shuler, Jr. |
| 4,989,134 | A | 1/1991 | Shaw |
| 5,088,036 | A | 2/1992 | Ellis et al. |
| 5,333,318 | A | 7/1994 | Wolf |
| 5,392,432 | A | 2/1995 | Engelstad et al. |
| 5,485,613 | A | 1/1996 | Engelstad et al. |
| 5,560,003 | A | 9/1996 | Nilsen et al. |
| 5,687,370 | A | 11/1997 | Garst et al. |
| 5,801,943 | A | 9/1998 | Nasburg |
| 5,845,278 | A | 12/1998 | Kirsch et al. |
| 5,845,298 | A | 12/1998 | O'Connor et al. |

(Continued)

FOREIGN PATENT DOCUMENTS

EP 0 904 055 A1 9/1999

(Continued)

OTHER PUBLICATIONS

Jones and Lins, "Garbage Collection: Algorithms for Automatic Dynamic Memory Management," 1996, pp. 165-179, Wiley, New York.

(Continued)

*Primary Examiner*—Shahid Alam
*Assistant Examiner*—Jean Bolte Fleurantin
(74) *Attorney, Agent, or Firm*—Osha·Liang LLP

(57) ABSTRACT

A garbage collector that reclaims memory space no longer needed by a mutator treats a generation of a dynamically allocated heap as being divided into "car" sections. For each car section, the collector maintains a remembered-set structure in which it keeps a record of the locations in the generation where the collector has previously found references to locations in that car section. The collector operates in increments in each of which it collects a respective collection set consisting of one or more of the generation's car sections. From the remembered sets associated with a collection set's car sections, it generates scratch-pad lists whose entries tell where locations identified by those remembered sets still contain references to collection-set locations. In situations in which the remembered sets are particularly large, the collector divides the operation of generating the scratch-pad lists into a plurality of collection intervals separated by mutator intervals. The collector bases its identification of reachable collection-set objects on the scratch-pad-list entries. By dividing the scratch-pad-list generation into multiple collection intervals, the collector can keep pause times low while employing relatively large collection sets.

22 Claims, 25 Drawing Sheets

U.S. PATENT DOCUMENTS

| | | | |
|---|---|---|---|
| 5,857,210 | A | 1/1999 | Tremblay et al. |
| 5,873,104 | A | 2/1999 | Tremblay et al. |
| 5,873,105 | A | 2/1999 | Tremblay et al. |
| 5,900,001 | A | 5/1999 | Wolczko et al. |
| 5,903,900 | A | 5/1999 | Knippel et al. |
| 5,930,807 | A | 7/1999 | Ebrahim et al. |
| 5,953,736 | A | 9/1999 | O'Connor et al. |
| 5,960,087 | A | 9/1999 | Tribble et al. |
| 5,999,974 | A | 12/1999 | Ratcliff et al. |
| 6,021,415 | A | 2/2000 | Cannon et al. |
| 6,047,125 | A | 4/2000 | Agesen et al. |
| 6,049,390 | A | 4/2000 | Notredame et al. |
| 6,049,810 | A | 4/2000 | Schwartz et al. |
| 6,065,020 | A | 5/2000 | Dussud |
| 6,098,089 | A | 8/2000 | O'Connor et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1 * | 2/2001 | Garthwaite ................ 707/206 |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,308,185 | B1 | 10/2001 | Grarup et al. |
| 6,314,436 | B1 | 11/2001 | Houldsworth |
| 6,321,240 | B1 | 11/2001 | Chilimbi et al. |
| 6,353,838 | B1 | 3/2002 | Sauntry et al. |
| 6,381,738 | B1 | 4/2002 | Choi et al. |
| 6,393,439 | B1 | 5/2002 | Houldsworth et al. |
| 6,415,302 | B1 * | 7/2002 | Garthwaite et al. ......... 707/206 |
| 6,424,977 | B1 * | 7/2002 | Garthwaite ................ 707/206 |
| 6,434,576 | B1 * | 8/2002 | Garthwaite ................ 707/206 |
| 6,434,577 | B1 * | 8/2002 | Garthwaite ................ 707/206 |
| 6,442,661 | B1 | 8/2002 | Dreszer |
| 6,449,626 | B1 * | 9/2002 | Garthwaite et al. ......... 707/206 |
| 6,496,871 | B1 | 12/2002 | Jagannathan et al. |
| 6,529,919 | B1 * | 3/2003 | Agesen et al. .............. 707/206 |
| 6,567,905 | B1 | 5/2003 | Otis |
| 6,640,278 | B1 | 10/2003 | Nolan et al. |
| 6,757,890 | B1 | 6/2004 | Wallman |
| 6,769,004 | B1 | 7/2004 | Barrett |
| 6,820,101 | B1 | 11/2004 | Wallman |
| 6,826,583 | B1 | 11/2004 | Flood et al. |
| 6,868,488 | B1 * | 3/2005 | Garthwaite ................ 711/173 |
| 6,892,212 | B1 | 5/2005 | Shuf et al. |
| 6,928,460 | B1 | 8/2005 | Nagarajan et al. |
| 6,931,423 | B1 | 8/2005 | Sexton et al. |
| 7,024,437 | B1 * | 4/2006 | Garthwaite ................ 707/206 |
| 7,031,990 | B1 * | 4/2006 | Garthwaite ................ 707/206 |
| 7,072,918 | B1 * | 7/2006 | Garthwaite ................ 707/206 |
| 2002/0032719 | A1 | 3/2002 | Thomas et al. |
| 2002/0095453 | A1 | 7/2002 | Steensgaard |
| 2002/0133533 | A1 | 9/2002 | Czajkowski et al. |
| 2002/0138506 | A1 | 9/2002 | Shuf et al. |
| 2003/0088658 | A1 | 5/2003 | Davies et al. |
| 2003/0200392 | A1 | 10/2003 | Wright et al. |
| 2003/0217027 | A1 | 11/2003 | Farber et al. |
| 2004/0010586 | A1 | 1/2004 | Burton et al. |
| 2004/0039759 | A1 | 2/2004 | Detlefs et al. |
| 2004/0215914 | A1 | 10/2004 | Dussud |

FOREIGN PATENT DOCUMENTS

| | | |
|---|---|---|
| EP | 0 969 377 A1 | 1/2000 |
| WO | WO0188713 A2 | 11/2001 |

OTHER PUBLICATIONS

Paul Wilson, "Uniprocessor Garbage Collection Techniques," Technical Report, University of Texas, 1994.

Hudson and Moss, "Incremental Collection of Mature Objects," Proceedings of International Workshop on Memory Management, 1992, Springer-Verlag.

Grarup and Seligmann, "Incremental Mature Garbage Collection," M. Sc. Thesis, Available at http://www.daimi.au.dk/-jacobse/Papers/.

Seligmann and Grarup, "Incremental Mature Garbage Collection Using the Train Algorithm," Proceedings of ECOOP '95, Ninth European Conference on Object-Oriented Programming, 1995, http://www.daimi.au.dk/-jacobse/Papers/.

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, Apr. 4, 1978, pp. 280-294.

Appel, Ellis, and Li, "Real-time Concurrent Collection on Stock Multiprocessors," ACM SIGPLAN Notices, 1988.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984, Austin, Texas.

Herlihy and Moss, "Lock-Free Garbage Collection for Multiprocessors," ACM SPAA, 1991, pp. 229-236.

Bacon, Attanasio, Lee, Rajan. and Smith, "Java without the Coffee Breaks: A Nonintrusive Multiprocessor Garbage Collector," SIGPLAN Conference on Programming Language Design and Implementation, Snowbird, Utah, Jun. 2001.

James Stamos, "Static Grouping of Small Objects to Enhance Performance of a Paged Virtual Memory," ACM Transactions on Computer Systems, vol. 2, No. 2, pp. 155-180, May 1984.

David A. Moon, "Garbage Collection in a Large Lisp System," Conference Record of the 1984 ACM Symposium on LISP and Functional Programming, Austin, Texas, Aug. 1984, pp .235-246.

Robert Courts, "Improving Locality of Reference in a Garbage-Collecting Memory Management System," Communications of the ACM, Sep. 1988, pp .1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada.

Lam, Wilson, and Moher, "Object Type Directed Garbage Collection to Improve Locality," Proceedings of the International Workshop on Memory Management '92, St. Malo, France, Sep. 1992, pp .404-425.

Chilimbi and Larus, "Using Generational Garbage Collection to Implement Cache-Conscious Data Placement," International Symposium on Memory Management, Oct. 1998.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algorithm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Module-3 and Smalltalk," in OOPSLA/ECOOP Workshop on Garbage Collection in Object-Oriented Systems, Oct. 1990, Edited by Eric Jul and Niels-Cristial Juul.

Hudson and Hosking, "Remembered sets can also play cards," in OOPSLA/ECOOP Workshop on Garbage Collection in Object-Oriented Systems, Oct 1993, Edited by Moss, Wilson, and Zorn.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988.

U.S. Appl. No. 10/287,851, Garthwaite et al., filed Nov. 5, 2002.

Appleby, Karen, "Garbage Collection for Prolog Based on WAM, vol. 31, Issue 6", Communication of the ACM, Jun. 1, 1998, 719-741.

Arora, et al., "Thread Scheduling for Multiprogrammed Multiprocessors", Proceedings of the 10th Annual ACM Symposium on Parallel Algorithms and Architecture, Jun. 1998.

Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Clark, "An Efficient List-Moving Algorithm Using Constant Workspace, vol. 19 No. 6", Communications of the ACM, Jun. 1976, 352-354.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Hanson, "Fast Allocation and Deallocation of Memory Based on Object Lifetimes", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Holzle, Urs, "A Fast Write Barrier for Generational Garbage Collectors", Workshop on Garbage Collection in Object Oriented Systems, Oct. 1993.

Hudson, et al., "A Language—Independent Garbage Collector Toolkit", Coins Techincal Report, Sep. 1991.

Hudson, et al., "Training Distributed Garbage: The DMOS Collector", University of St. Andrews Tech Report, 1997, 1-26.

Hudson, et al., "Garbage Collecting the World: One Car at a Time", ACM SIGPLAN Notices 32, 1997, 162-175.

Hudson, et al., "Sapphire: Copying GC Without Stopping the World", Practice and Experience Special Issue, Date Unknown, JAVA/Grande/Iscope.

Liskov, et al., "Partitioned Garbage Collection of a Large Stable Heap", Proceedings of IWOOOS, 1996, 117-121.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Nettles, Scott, "Real-Time Replication Garbage Collection", Avionics Lab, Wright Research and Development Center, 1993, PDDI.

Padopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databases Using Transactional Cyclic Reference Counting", VLDB Journal—The International Journal on Very Large Da Bases, vol. 7, Issue 3, 1998, 179-193.

Shuf, et al., "Exploiting Profilic Types for Memory Management and Optimizations. ACM ISBN Sep. 2, 2001", POPL, Jan. 2002, Portland.

Ungar, et al., "Tenuring Policies for Generation-Based Storage Reclamation", ACM SIGPLAN Notices, 1988, 23(11)1-17.

Venners, "Garbage Collection, Inside the Java 2 Virtual Machine; Chapter 9", www.artima.com, Date Unknown, parts 1-18.

Wilson, "Uniprocessor Garbage Collection Techniques", Proceedings of Int'l Workshop on Memory Management, 1992, V. 637.

Withington, P.T., "How Real is "Real-Time" GC?", Symbolics, Inc., Oct. 6, 1991, Burlington, MA.

Zee, et al., "Write Barrier Removal by Static Analysis", OOPSLA '02, Nov. 2002.

Zorn, "Segregating Heap Objects by Reference Behavior and Lifetime", In 8th Int'l Conferenceon Architectural Support for Programming Languages and Operating Systems, Oct. 1998, 12-32, San Jose, CA.

Zorn, Benjamin, "Barrier Methods for Garbage Collection", Dept. of Computer Science, Uni. of Colorado, Nov. 1990, 1-37, Boulder.

Azagury, et al., "Combining Card Marking With Remembered Sets: How to Save Scanning Time", ACM SIGPLAN Notices, Oct. 1998, V. 34(3), ACM Press, Vancouver, Canada.

Cheney, "A Nonrecursive List Compacting Algorithm, vol. 13, No. 11", Communications of the ACM, Nov. 1970, 677-678, Uni. Math. Lab., Cambridge, European Patent Office.

Cheng, et al., "Generational Stack Collection and Profile-Driven Pretenuring", SIGPLAN'98 Conference on Programming Languages Design and Implementation, Jun. 1998, 162-173, ACM Press, Montreal, Canada.

Lam, et al., "Effective Static-Graph Reorganization to Improve Locality in Garbage Collected Systems", Proceedings of ACM SIGPLAN Conference on Programming Language Design and Implementation, Jun. 1991, Toronto, Canada.

Pirinen, Pekka, "Barrier Techniques for Incremental Tracing", Harlequin Limited, Date Unknown, 20-25, Cambridge, Great Britain.

\* cited by examiner

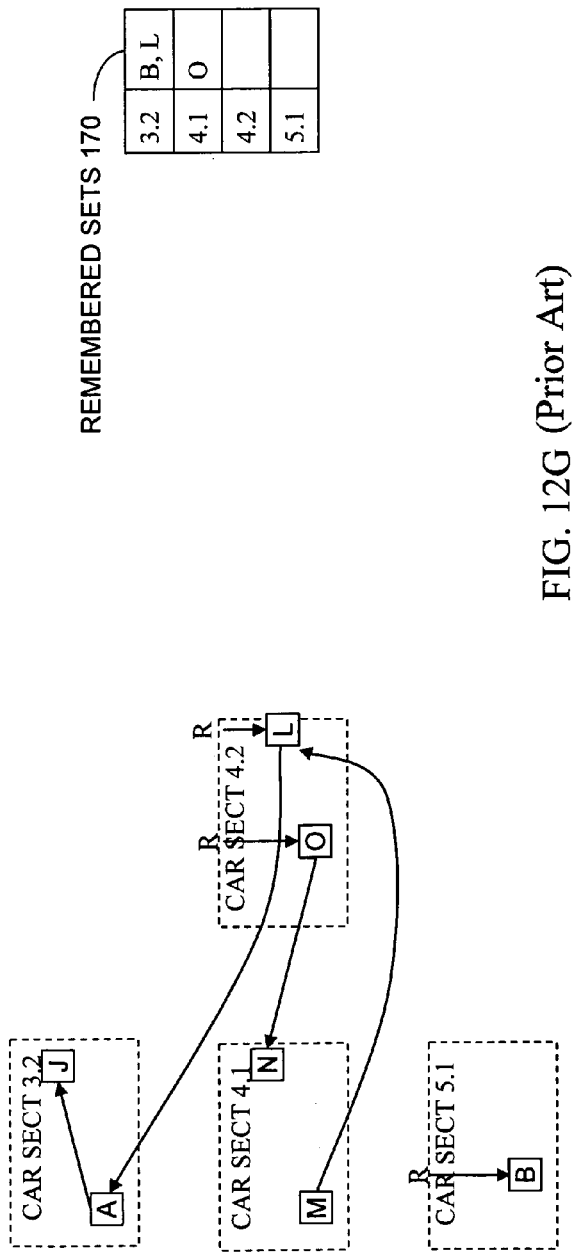
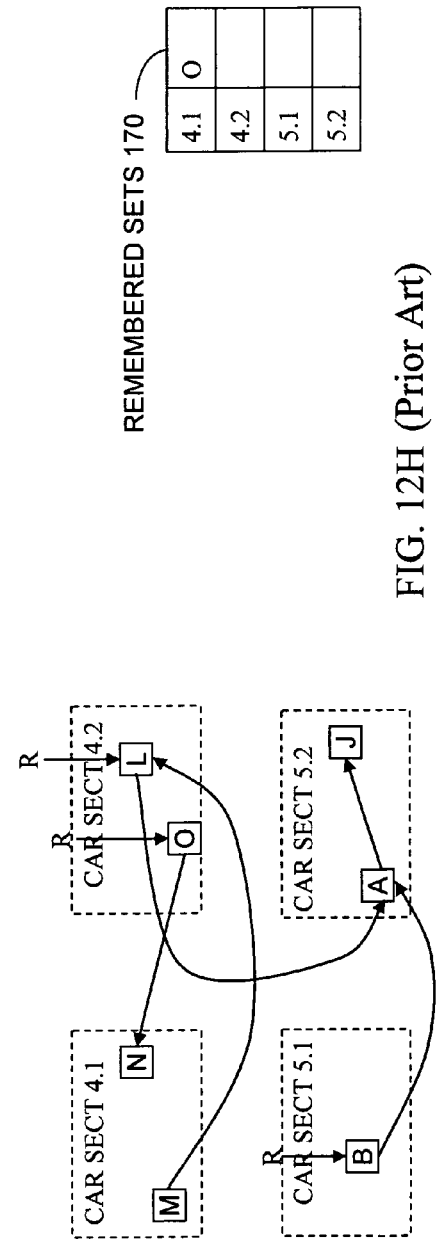
FIG. 12G (Prior Art)
FIG. 12H (Prior Art)

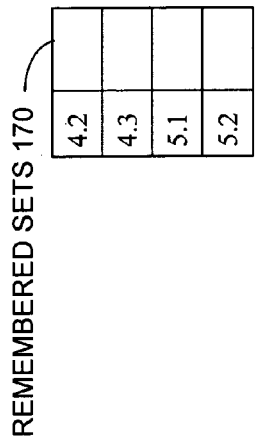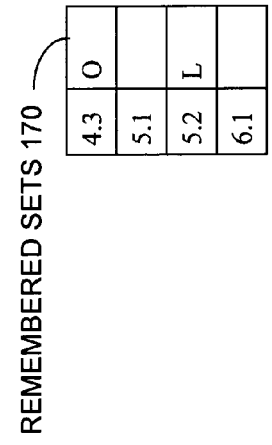
FIG. 12I (Prior Art)
FIG. 12J (Prior Art)
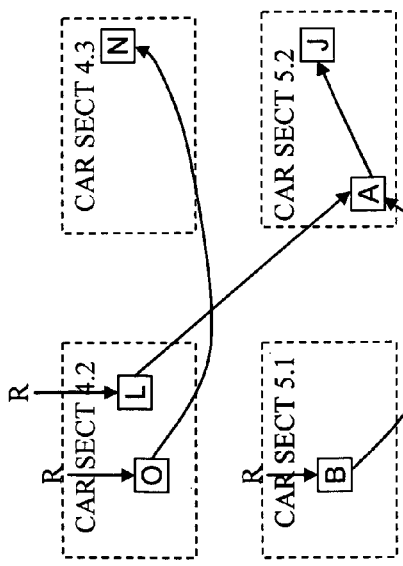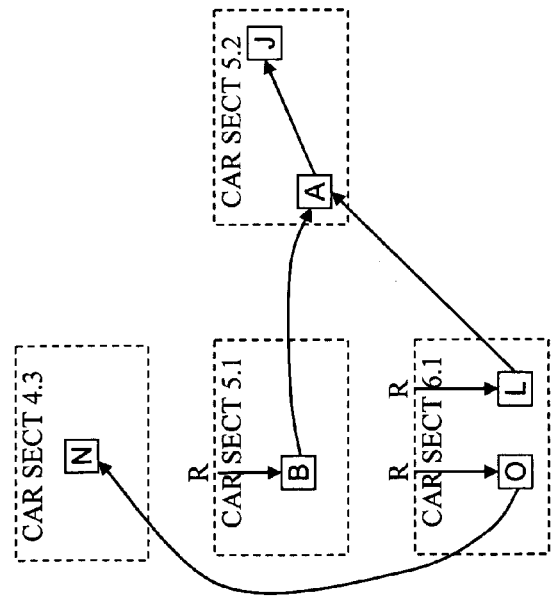

STAGING THE PROCESSING OF REMEMBERED-SET ENTRIES AS PART OF COLLECTION BASED ON THE TRAIN ALGORITHM

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data and instructions for operating on them that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices such as communications interface 16 through a system bus 17. The memory space made available to an application program may be "virtual" in the sense that it can actually be considerably larger than RAM 14 provides. So the RAM contents will be swapped to and from a system disk 18.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 18 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 18 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. The arrangement of FIG. 3 differs from FIG. 2 in that the compiler 23 for converting the human programmer's code does not contribute to providing the garbage-collection function; that results largely from the virtual machine 27's operation.

Those skilled in that art will recognize that both of these organizations are merely exemplary, and many modern systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory space that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collection intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times. The invention to be discussed below is directed to garbage collectors that collect incrementally, and it addresses the problem of long pause times that can result even when that approach is employed. It will become apparent that it is applicable to most types of incremental collection. For the sake of concreteness, though, we will consider as an example a particular type of incremental collector, one that divides the garbage-collected heap into "generations" and employs the "train algorithm" on one but not all of the generations.

In many collectors, different portions, or generations, of the heap are subject to different collection policies. New objects are usually allocated in a "young" generation, and older objects are "promoted" from younger generations to older or more "mature" generations. Collecting the younger generations more frequently than the others yields greater efficiency because the younger generations tend to accumulate garbage faster; newly allocated objects tend to "die," while older objects tend to "survive."

For the sake of example, consider FIG. 6, which depicts a garbage-collected heap as divided into a relatively small young generation 58 and larger old generation 60. Let us assume that mutator execution is interrupted from time to time for collection intervals in each of which the entire young generation 58 is collected but not the entire old generation. The operation of collecting the young generation 58 by itself may be more or less the same as that described in connection with FIGS. 4 and 5 for the entire heap, with one major exception: the root set must be considered to include not only the call stack, registers, and global variables represented by set 52 but also objects in the old generations 60, since such objects may themselves may contain references to objects in the young generation 58. So pointers must be traced not only from the basic root set 52 but also from objects within the old generation.

One could perform this tracing by simply inspecting all references in the old generation 60 at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been written since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the old generation 60 as being divided into smaller sections, known for this purpose as "cards." Card table 62 contains an entry for each card. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written.

Some collectors collect the entire young generation in every interval and may thereafter perform old-generation collection in the same interval. It may therefore take relatively little time to scan all young-generation objects remaining after young-generation collection to find references into the old generation. As the drawing indicates, the illustrated example use a card table to help find old-generation objects but does not them for finding young-generation references that refer to mature-generation objects. A card table is shown for the old generation, though, since laboriously scanning the entire old generation for references to young-generation (or old-generation) objects would ordinarily take too long.

Now, although it typically takes very little time to collect the young generation, it may take more time than is acceptable within a single garbage-collection interval to collect the entire old generation. So some garbage collectors may collect the old generation itself incrementally. That is, the collection set may consist of only a portion of the old generation; an object in the collection set is considered reachable if it is referred to from outside the collection set, even if the reference is in the same, old generation. This is true because objects outside the collection set are not so processed during the collection increment as to enable them to be recognized as unreachable.

To reduce the adverse effect this would otherwise have on collection efficiency, workers in this field have employed the "train algorithm." A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 74, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 74. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, as will be explained below, with much less effort than is usually required to prepare cars for reclamation. And the train algorithm so operates that inter-car references tend to be grouped into trains, as will now be explained.

To identify references into the car from outside of it, train-algorithm implementations (and other incremental collectors) typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 74's remembered set 90, lists locations in the generation where references into the associated car section have been found at some time or another.

The remembered sets for all of a generation's cars are typically updated at the start of each collection interval. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation to collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately.

If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found.

If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is withheld from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. The process of actually inspecting all remembered-set-identified locations for references into the remembered set is conventionally performed for only a single car section in any increment. In the absence of features such as those provided by the train algorithm, this would present a problem, because garbage structures may be larger than a car section. In such structures there would always be objects that (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage, and its memory space can be reclaimed without inspecting all of the memory locations identified by all of the remembered-set entries associated with all of its cars. This is the test that block 106 represents.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is updated to point to the evacuated object's new location, as block 130 indicates. And, as block 132 indicates, any reference contained in the evacuated object is processed, in an operation that FIGS. 1A and 1B (together, "FIG. 11") depict.

For each one of the evacuated object's references, the collector determines whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate example results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed. Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

As was mentioned above, incremental collection is helpful in keeping pause times low. Still, it exacts some efficiency costs, since many unreachable objects cannot immediately be recognized as such. The resultant inefficiency tends to be less when collection sets are larger, so it is helpful to choose a collection set whose size is the greatest value that is not inconsistent with the desired pause-time limit. Unfortunately Unfortunately, the time required to collect a given-size collection set varies greatly. There are a number of reasons for this, but a principal reason is the variability in remembered-set size. At any given time, there may be a relatively large number of references to objects in one car section and a relatively small number of references to objects in a different car section. Moreover, different rates of mutation result in different numbers of "stale" remembered-set entries. A remembered-set entry is made whenever, as a result of a reference modification, the collector finds a reference into the car with which the remembered set is associated. But an entry is not removed from a given car section's remembered set when a reference is so modified as no longer to refer to an object in that car section: the entry becomes stale.

When a car section comes up for collection, the collector must inspect all of the locations that the car section's remembered set entries identify. Even if there currently are not many references to objects in a given car section, therefore, the operation of inspecting all of the remembered-set-identified locations can take a long time, because the remembered set may contain a great many stale entries.

SUMMARY OF THE INVENTION

I have recognized that pause-time limits can be kept relatively low for a given collection-set size by performing a collection increment in multiple collection intervals. It may seem that doing so would compromise the collection operation's accuracy because the mutator then ends up changing references in the middle of collection increment. But I have further recognized this complication can be dealt with effectively in a wide range of applications. Specifically, a collection increment would normally be performed in a single interval, but it would be divided into multiple intervals in those instances in which the size of the remembered set would result in the pause time's becoming excessive. When that happens, the collector divides into a plurality of intervals the operation of identifying where among the many locations that the remembered set identifies, references to collection-objects actually reside. When a list of reference locations has thus been developed from the remembered set, the actual reclamation operation, including evacuation of reachable objects in the case of a relocating collector, can usually be done if desired in a single interval.

It may seem initially that this approach does not address the problem of reference modifications in the midst of a collection increment; the list that results from culling the remembered-set-identified locations will itself identify locations that the mutator can change during the collection increment. That is, some of the locations that appear on that list when reclamation is to occur may no longer contain references to the collection set. But I have recognized that, although the resultant list can indeed end up containing stale references, the number that result as a practical matter will be small in a reasonably designed collector. (Of course, the stale entries result in no erroneous evacuations, since the references they identify will be—inexpensively—rechecked as part of the process.) And, in any event, the dynamic range of pause times that result from a given collection-set size is reduced significantly.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

DETAILED DESCRIPTION OF AN
ILLUSTRATIVE EMBODIMENT

According to the present invention, a collection increment will sometimes be performed in a plurality of collection intervals separated by mutator intervals. In most embodiments, though, most collection increments will actually occur within single respective intervals, because the collection-set size will ordinarily be so selected as to keep the pause time short enough in most instances. As will be seen, though, the collection increment includes a test to determine whether the current interval has taken too long. If it has, then the collection increment is interrupted for a mutator interval.

Figure 1:
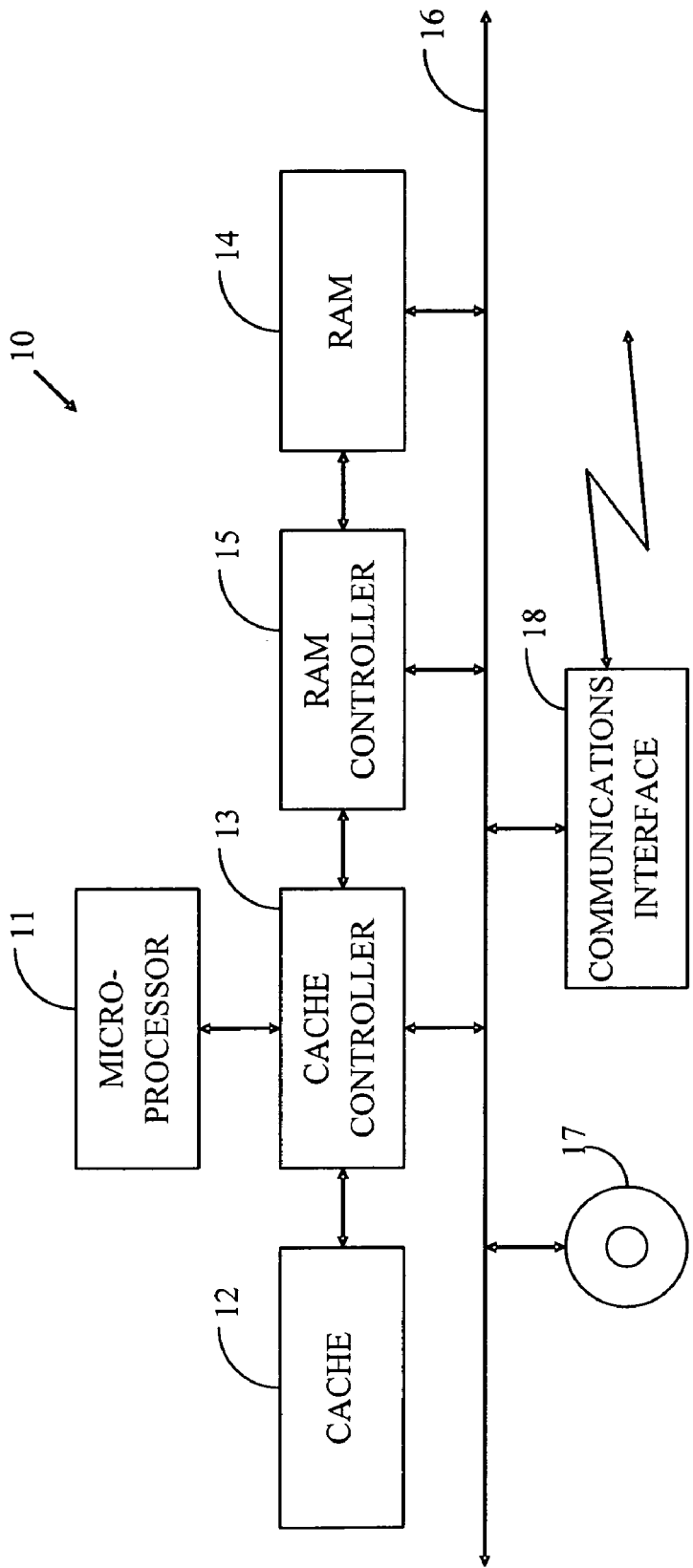
FIG. 1, discussed above, is a block diagram of a computer system in which the present invention's teachings can be practiced.
Figure 2:
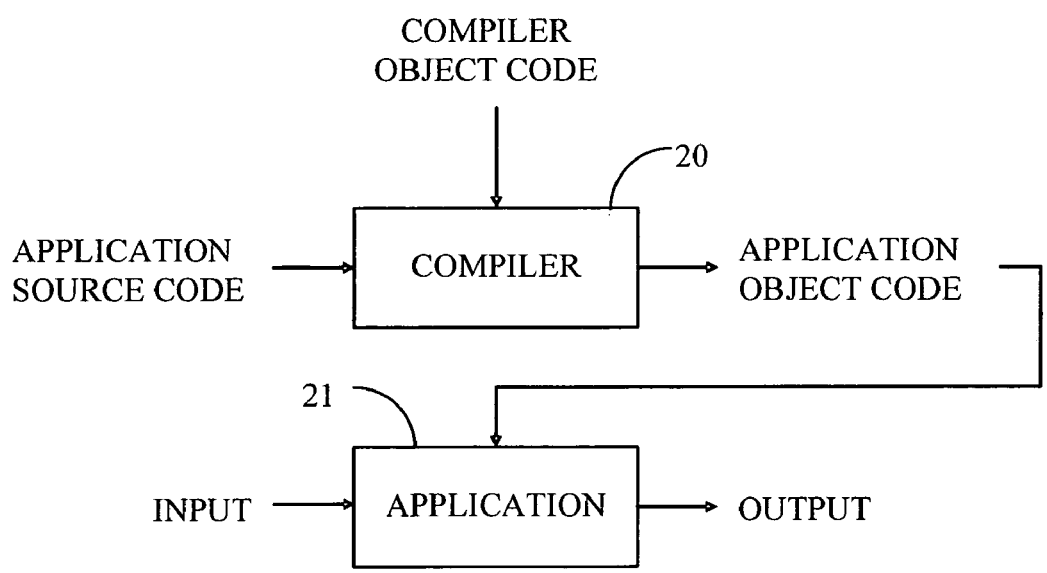
FIG. 2 as, discussed above, is a block diagram that illustrates a compiler's basic functions.
Figure 3:
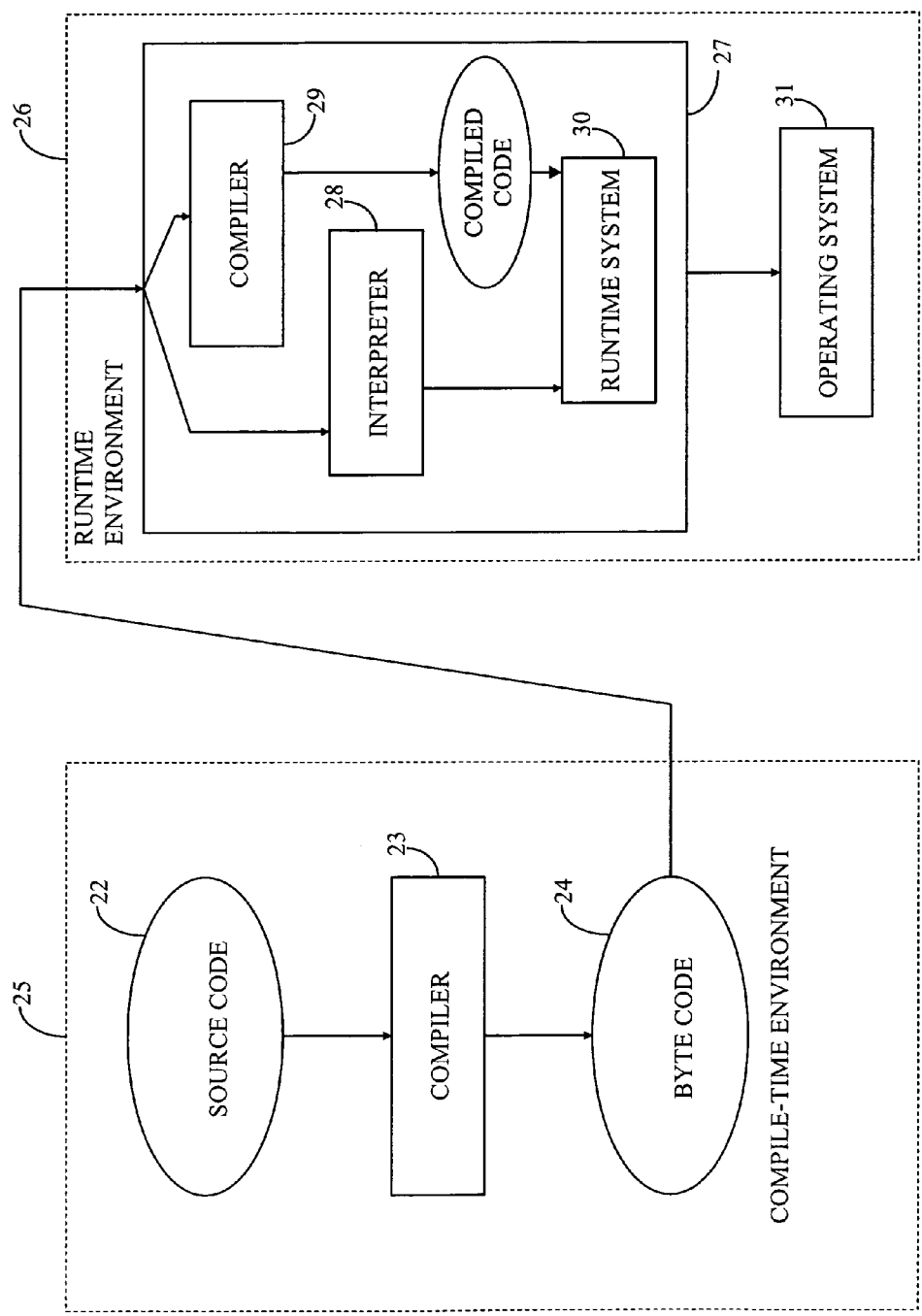
FIG. 3, discussed above, is a block diagram that illustrates a more-complicated compiler/interpreter organization.
Figure 4:
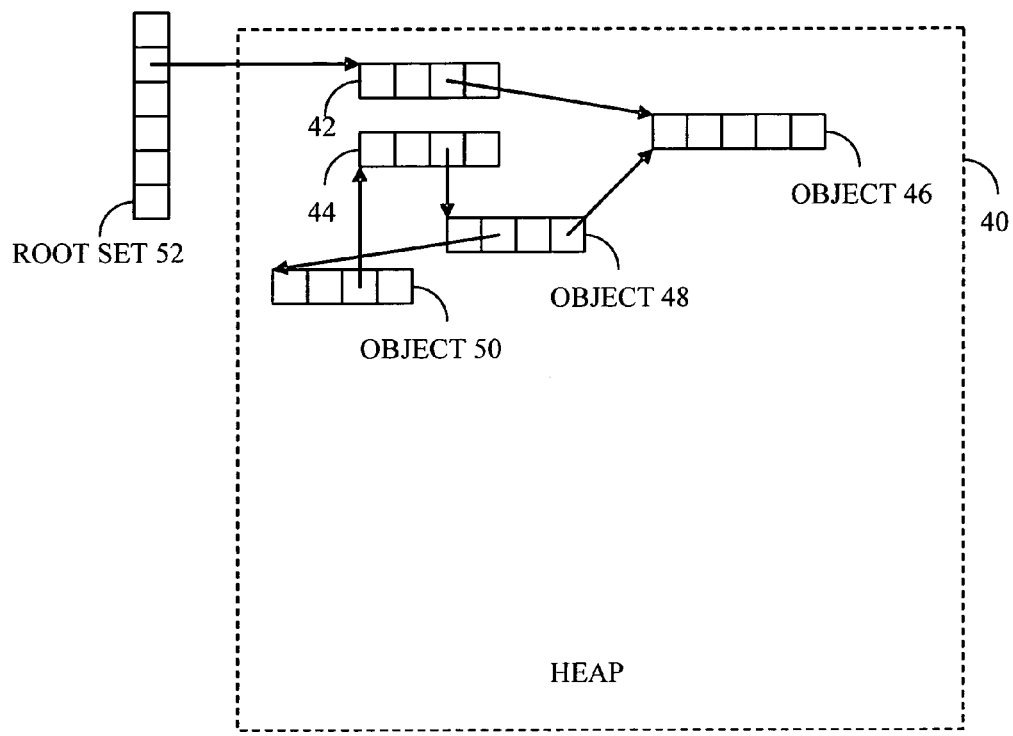
FIG. 4, discussed above, is a diagram that illustrates a basic garbage-collection mechanism.
Figure 5:
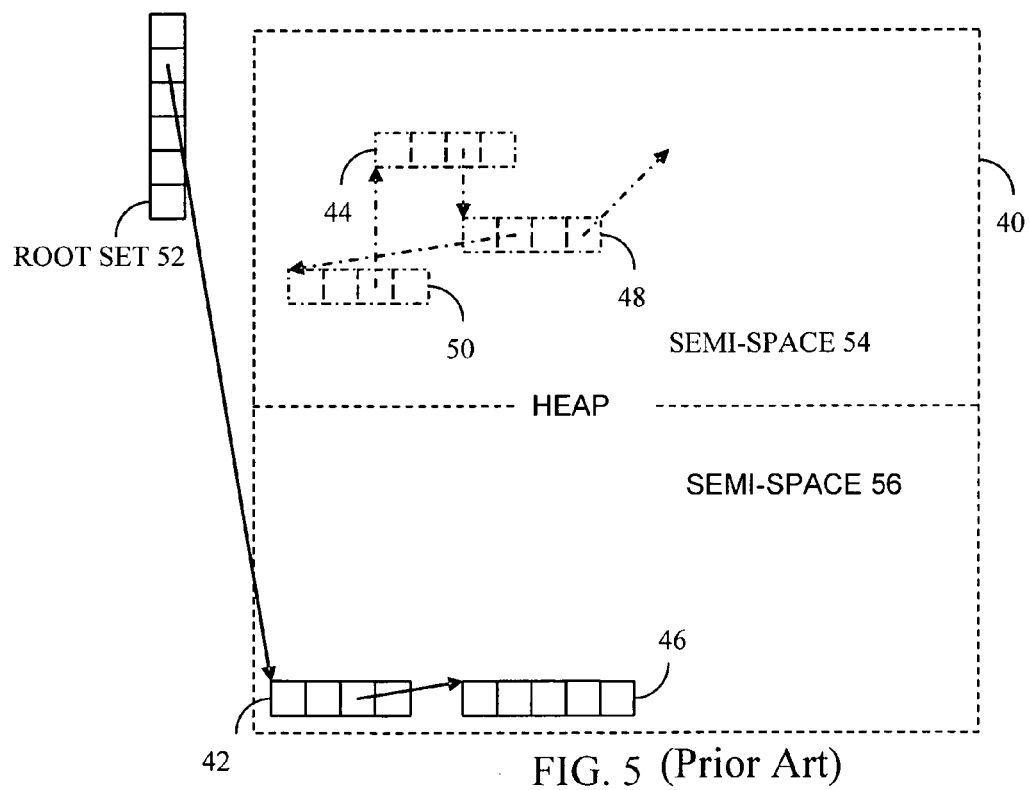
FIG. 5, discussed above, is a similar diagram illustrating that garbage-collection approach's relocation operation.
Figure 6:
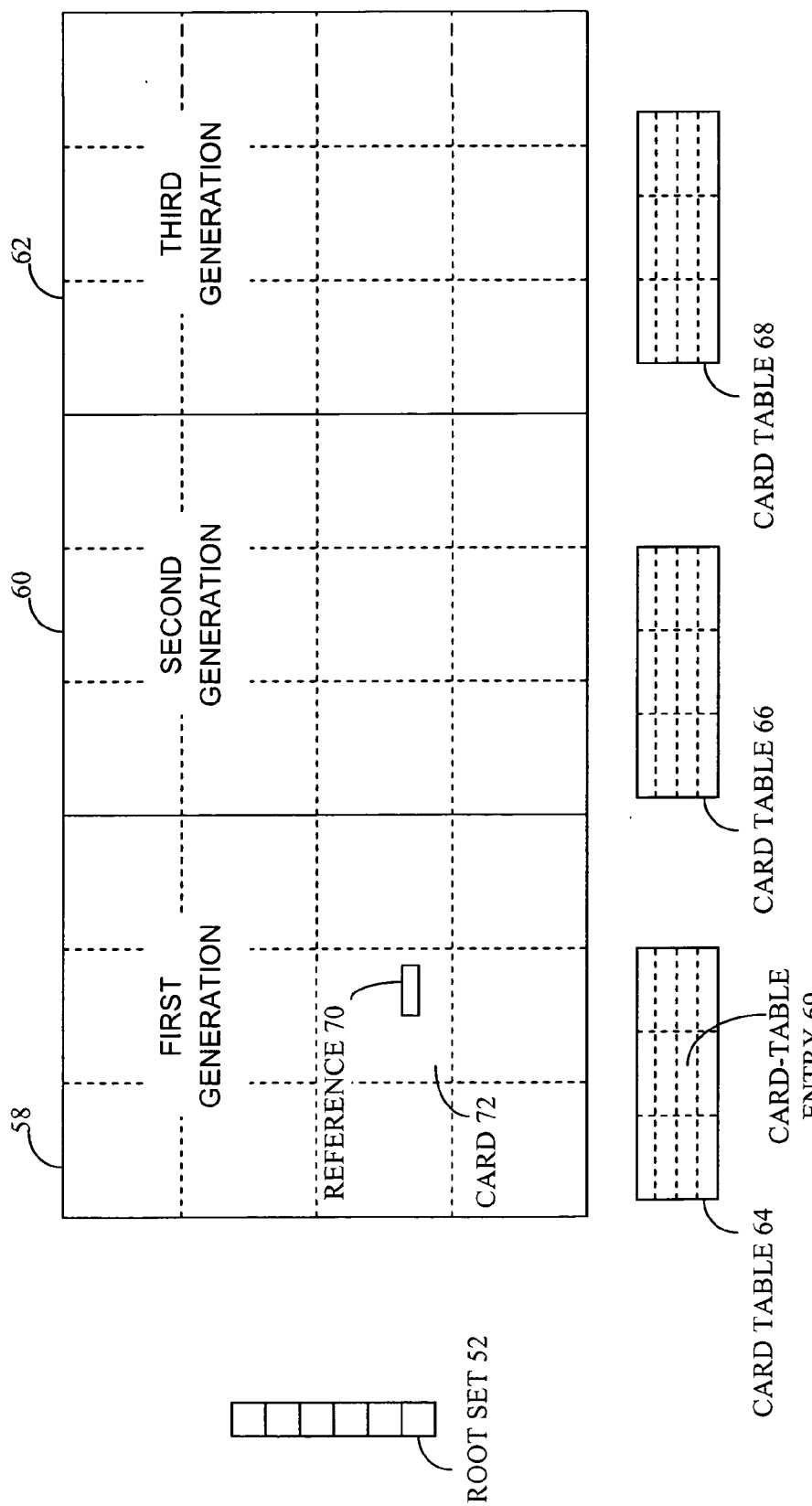
FIG. 6, discussed above, is a diagram that illustrates a garbage-collected heap's organization into generations.
Figure 7:
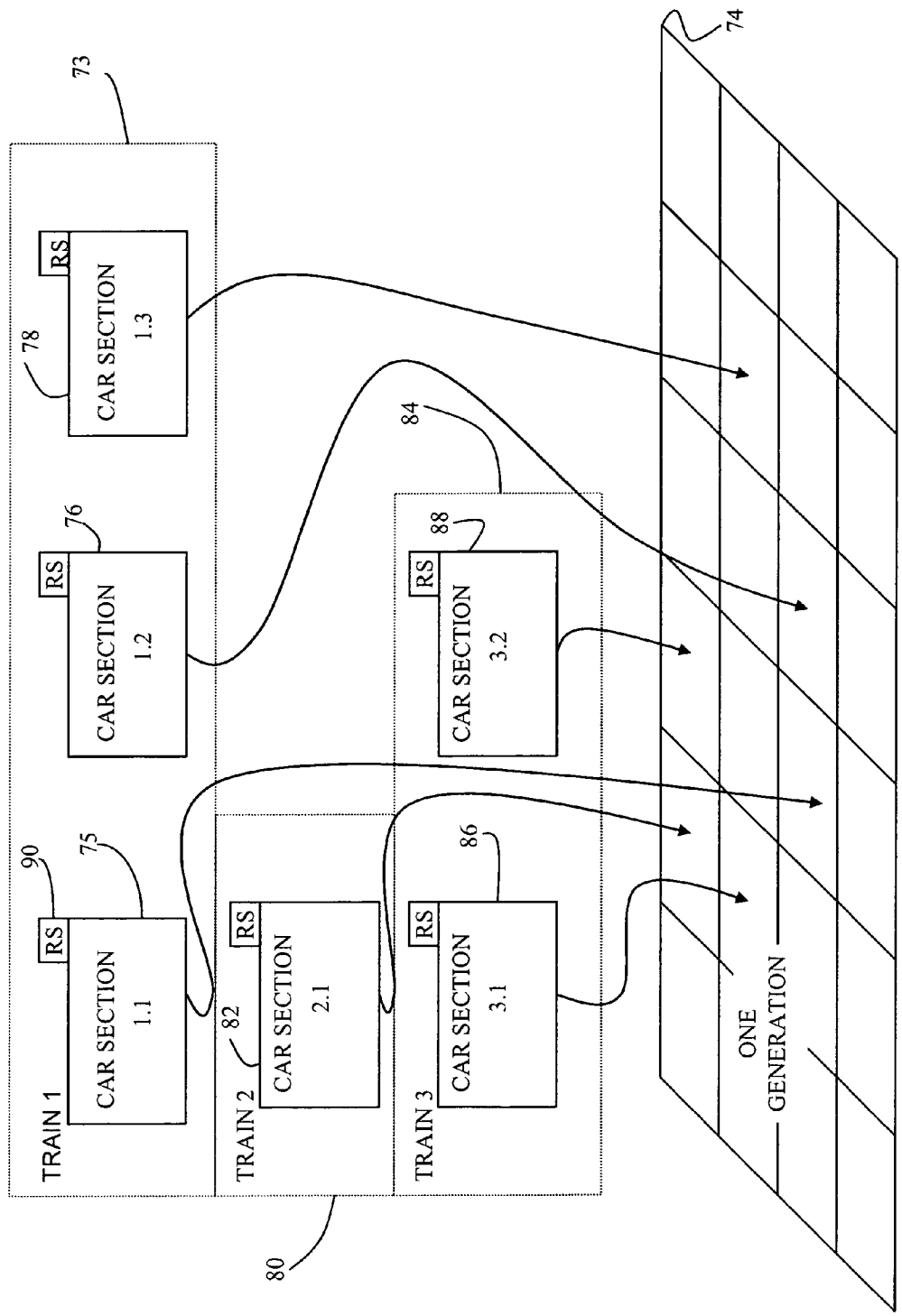
FIG. 7, discussed above, is a diagram that illustrates a generation organization employed for the train algorithm.
Figure 8A:
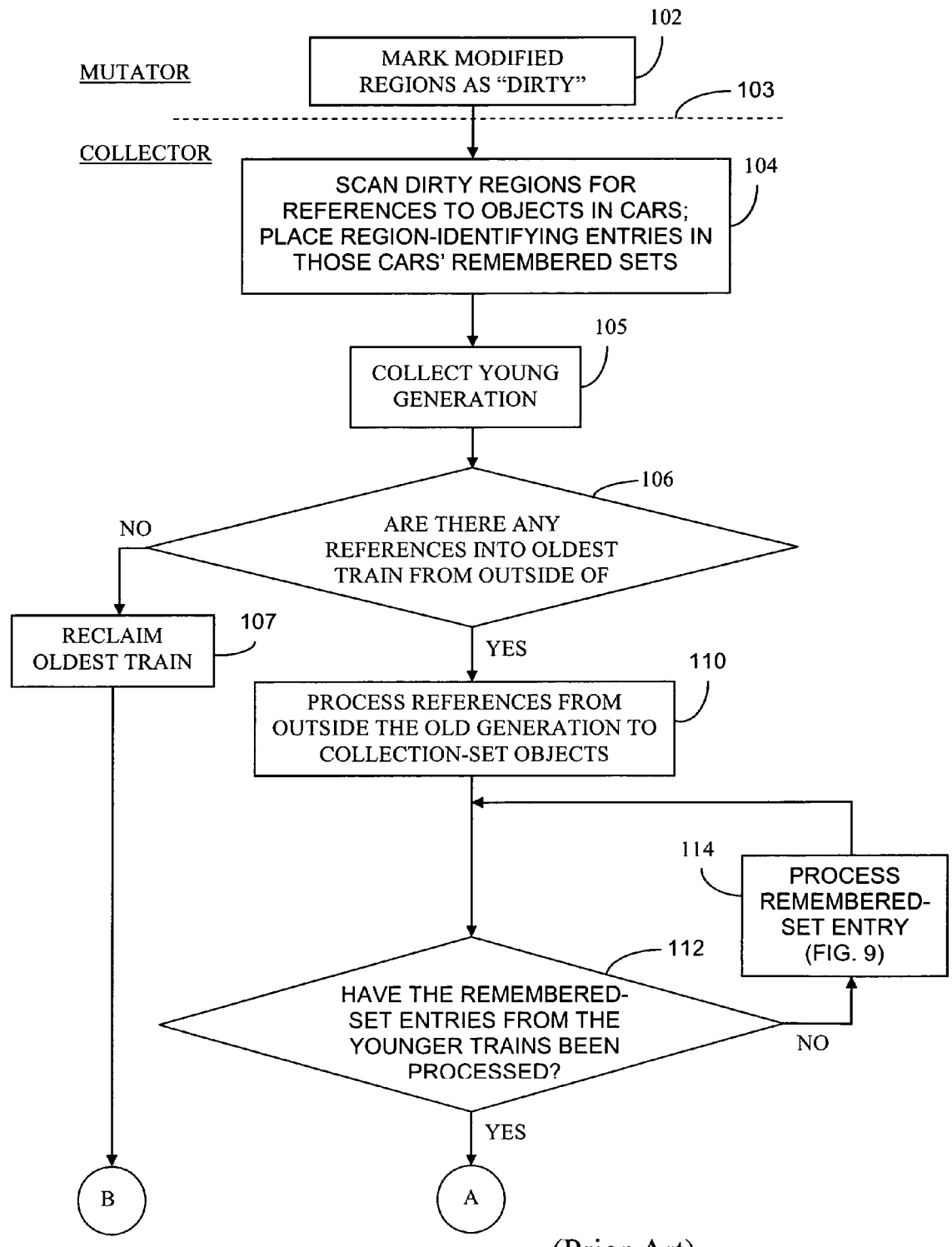
FIGS. 8A and 8B, discussed above, together constitute a flow chart that illustrates a garbage-collection interval that includes old-generation collection.
Figure 8B:
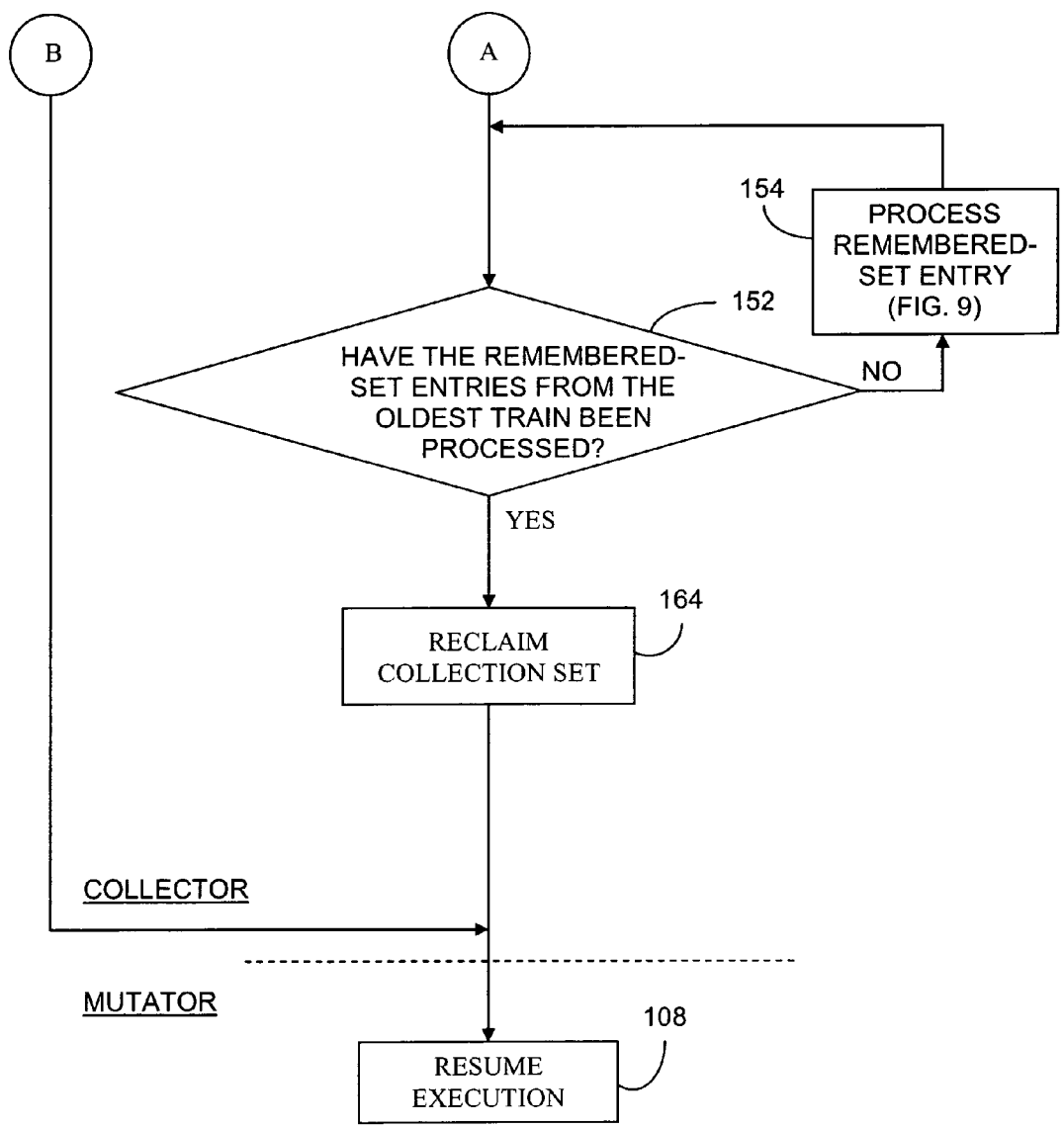
Figure 13A:
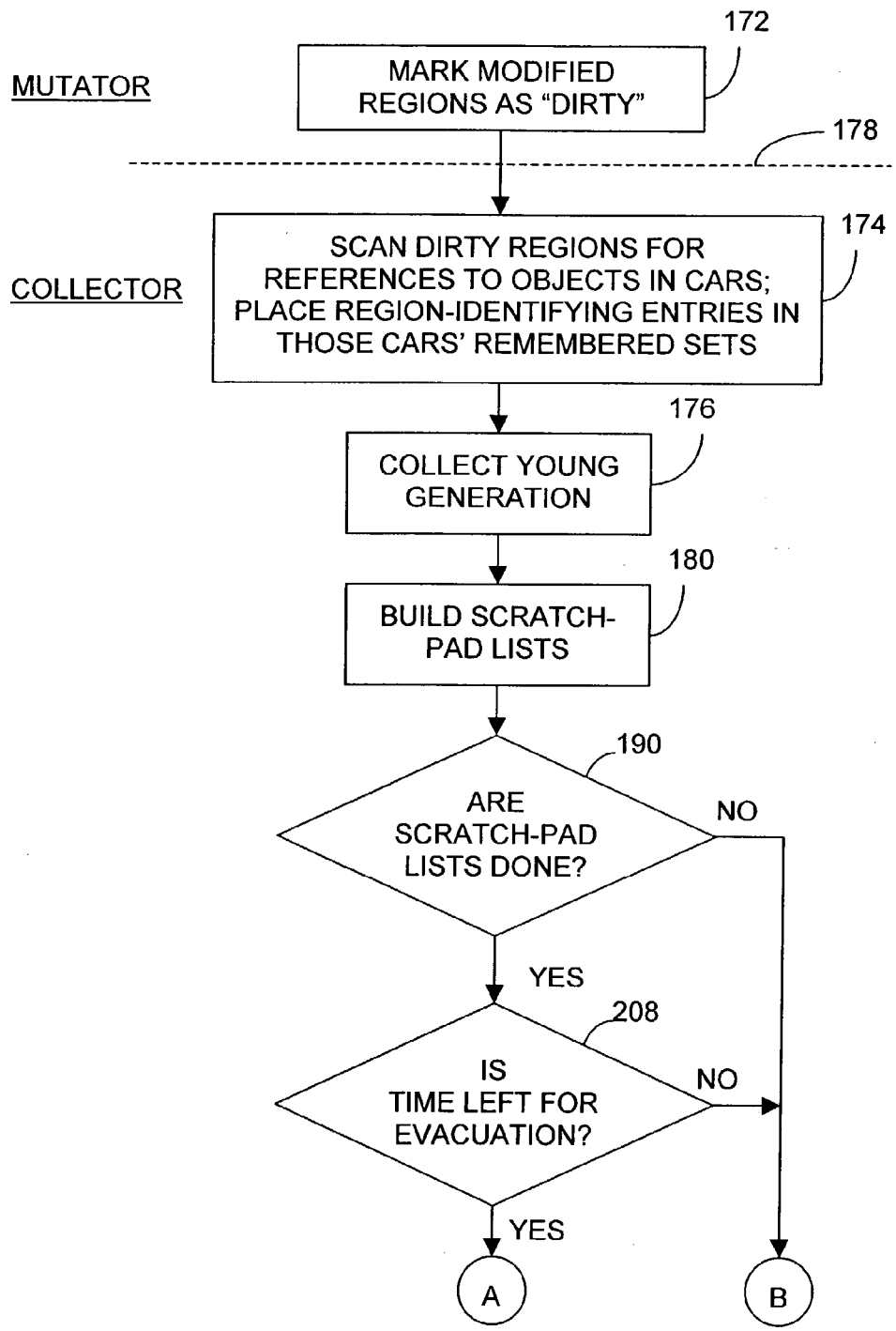
FIGS. 13A, 13B, and 13C together constitute a flow chart that illustrates a collection interval executed by an embodiment of the present invention.
Figure 13B:
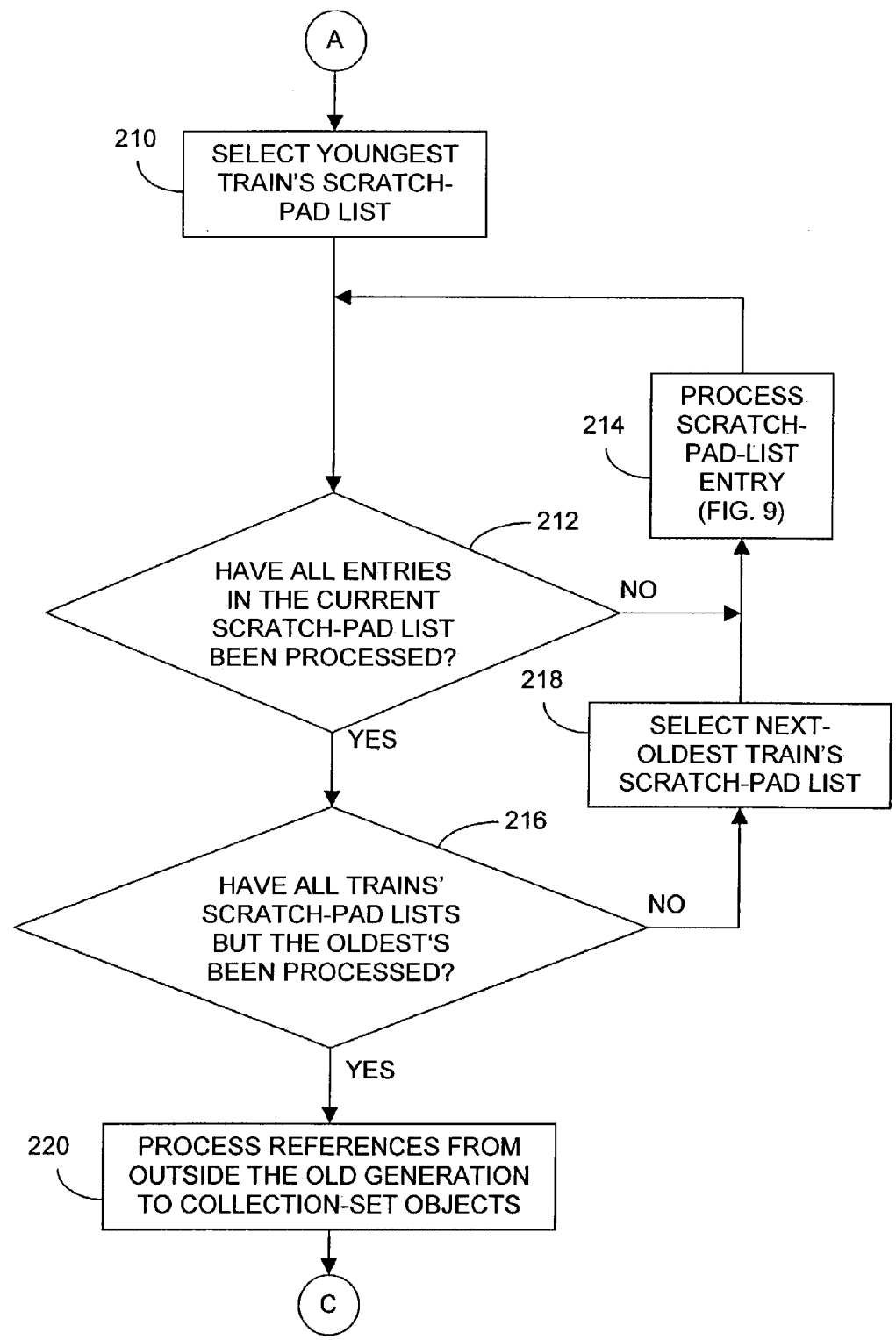

Although the present invention's teachings can be employed in a wide variety of incremental collectors, not just ones that are multi-generational and/or employ the train algorithm, we describe it below by reference to such an example, which FIGS. 13A, 13B, and 13C (together, "FIG. 13") illustrate. FIG. 13 depicts collection operation that is similar to that of FIG. 8, but FIG. 13 reflects the possibility of multiple-car collection sets and additionally depicts certain optimizations that some of the invention's embodiments may employ. Blocks 172, 174, and 176 represent operations that correspond generally to those that FIG. 8's blocks 102, 106, and 108 do, although, as will be explained below, many of the present's embodiments will perform the remembered-set-updating function of the block-176 operation in a manner that differs somewhat from the conventional approach. Also, dashed line 178 represents passage of control from the mutator to the collector as FIG. 8's dashed line 104 does.

Figure 14:
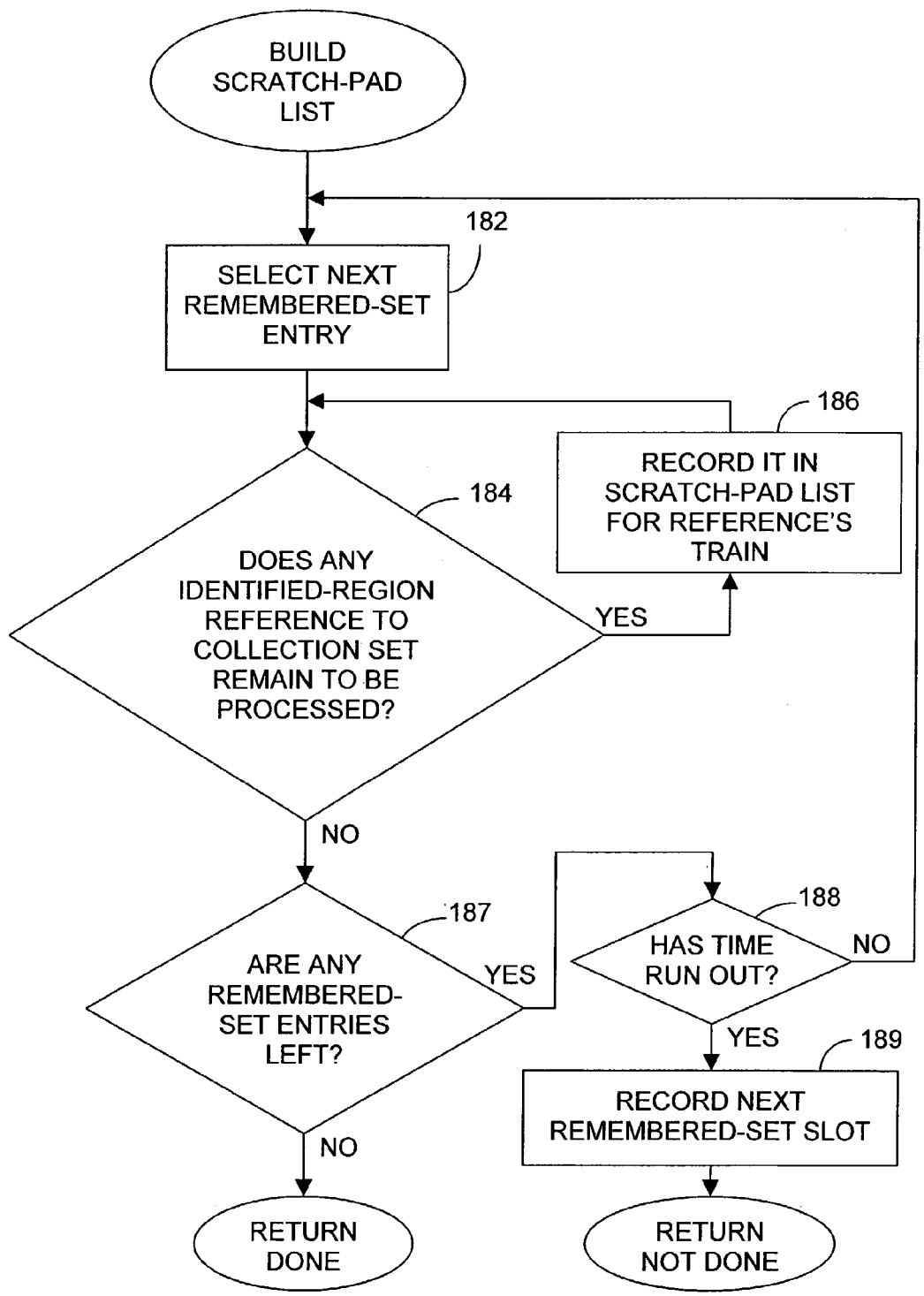
FIG. 14 is a flow chart of a routine for building scratch-pad-list entries that the illustrated embodiment employs.

Instead of going directly from young-generation collection to the operation of evacuating reachable objects in response to remembered-set entries, though, the illustrated embodiment performs an operation represented by block 180, in which it compiles a scratch-pad list of where references to collection-set locations were found in remembered-set-identified locations. FIG. 14 depicts a routine for building the scratch-pad list. The scratch-pad list results from inspecting locations identified by remembered-set entries, and block 182 represents selecting the next entry in the remembered set for the current collection set.

Now, many of the present invention's embodiments will employ multiple-car collection sets, at least in some increments. This may be done for one or more of several reasons. One reason is to decouple the collection-set size from the unit of allocation to a train. As was explained above, memory space is added to trains in units of car sections. If car-section size is too great, the memory-space waste caused by partially filled cars may be unacceptable. As was also mentioned above, though, larger collection-set size tends to have a beneficial effect on collection efficiency. So it will often be valuable to make the collection-set size larger than a car section. Additionally, different operating conditions can result in different expected amounts of space reclamation from a given collection-set size, and the collector may therefore be so designed as to select collection-set size dynamically in accordance with conditions that it monitors. Employing different numbers of cars makes this practical. So the remembered set associated with the collection set may actually be a composite of a number of constituent remembered sets, each of which is associated with a respective collection-set car section.

In any event, the collector determines for each remembered-set entry whether there is any reference at that location to a location in the collection set. If there is, the collector will ordinarily place into the scratch-pad list an entry that; represents the location of the reference thereby found. Otherwise, the remembered-set entry has become stale, and the collector therefore makes no scratch-pad-list entry. The collector thus culls stale entries. (Actually, some embodiments may additionally perform tests that sometimes enable them to avoid making a scratch-pad-list entry even for an entry that is not stale. For the sake of simplicity, though, we assume here that the illustrated collector does not employ such a feature.)

For reasons that will become apparent below, the scratch-pad list is actually a composite list comprising a plurality of constituent scratch-pad lists, one for each of the generation's trains. When the collector finds a reference whose location needs to be recorded in the scratch-pad list, it places it into the constituent list associated with the train in which the reference is located.

The granularity with which a remembered-set entry specifies reference-containing locations may differ from collector to collector and from remembered set to remembered set in the same collector. A typical arrangement is for a remembered set ordinarily to employ single-word granularity: each of its entries is interpreted as specifying a region large enough to contain only a single word, i.e., a single reference. But some embodiments may switch to a coarser granularity if the data structure containing the remembered-set entries becomes too large. So blocks 184 and 186 indicate that the operation of inspecting references in a region identified by a remembered-set entry—and making any necessary scratch-pad-list entries—continues until every reference in the thus-identified region has been inspected.

The collector then performs the block-187 test of determining whether any remembered-set entries remain. If any do, the collector determines whether the current collection interval's duration has reached a predetermined limit, as block 188 indicates. If it has, then the routine returns after the collector records for future reference, as block 189 indicates, the location of the next remembered-set "slot" whose contents it has not yet processed to find references into the collection set. But the collection-set size will typically have been so selected that its collection usually proceeds to completion without the pause-time limit's having been reached. As blocks 187, 188, and 182 indicate, that is, the collector ordinarily continues selecting the next remembered-set entry and making any resultant scratch-pad-list entries until no remembered-set entries are left.

Figure 13C:
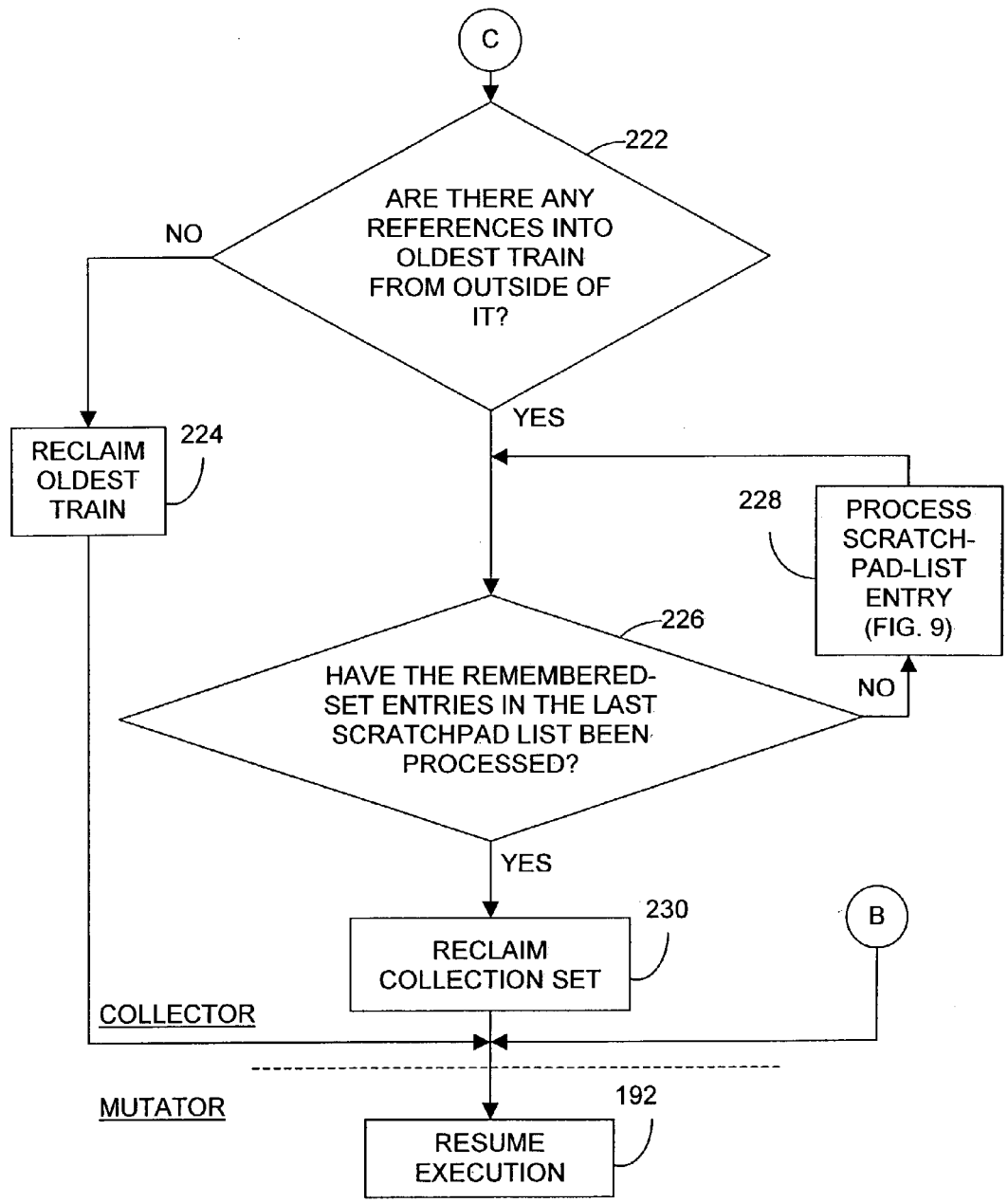

As FIG. 13's blocks 190 and 192 (FIG. 13C) indicate, the current collection interval will end without the collector's having completed the collection increment if, because the pause-time limit was reached, the collector interrupted that operation without completing it. In that case, mutator operation will resume and it will continue until an event occurs that, in accordance with the particular collector's policy, triggers another collection interval.

A typical trigger event is the young generation's becoming full and therefore needing to be collected to make room for more objects. We will assume that this is the policy employed by the illustrated embodiment, but such a policy is not a necessary feature of collectors that employ the present invention's teachings. Similarly, we will assume that the next interval, in which the old-generation-collection increment continues, will include a young-generation collection, as FIG. 13 block 176 indicates, but some two-generation collectors that employ the present invention's teachings for an older generation may instead omit younger-generation collection from some older-generation-increment intervals.

Let us now assume that a given collection increment's scratch-pad-list-building operation was interrupted because the interval's duration reached the pause-time limit, that an intervening mutator interval has occurred, and that the collection increment has resumed in a new interval. That interval again begins, as FIG. 13 indicates, with the remembered-set updating and young-generation collection that blocks 174 and 176 represent. And, when the collector reaches FIG. 13's scratch-pad-list-building operation 180, it again begins with FIG. 14's block-182 step of selecting the next remembered-set entry.

But the meaning of next in this context depends on the particular way in which multiple-interval collection increments are implemented. It is typical for a remembered set to be implemented as an open-address hash table. So the table slot corresponding to the location of a reference modified since the previous interval may be one whose contents the collector processed during that interval. One way of making sure that the collector does not miss such a reference is, when a new interval starts, to begin again at the first hash-table slot and therefore re-inspect slots that were processed before. To avoid reprocessing entries unnecessarily, the entry-processing operation can include setting the processed table slot to a value, say, NULL, whose meaning is that the slot is empty, i.e., that it identifies no location where a reference to the collection set has been found. When this has been done, most slots whose contents were processed in a previous interval will contain NULL values. In any event, the inspection operation is not as time-consuming as it would be if the previously inspected slots had not been thus cleared. Still, repeating the slot inspections adds to the cost of multiple-interval-increment support, and the action of clearing processed slots a exacts a cost, too.

Figure 15:
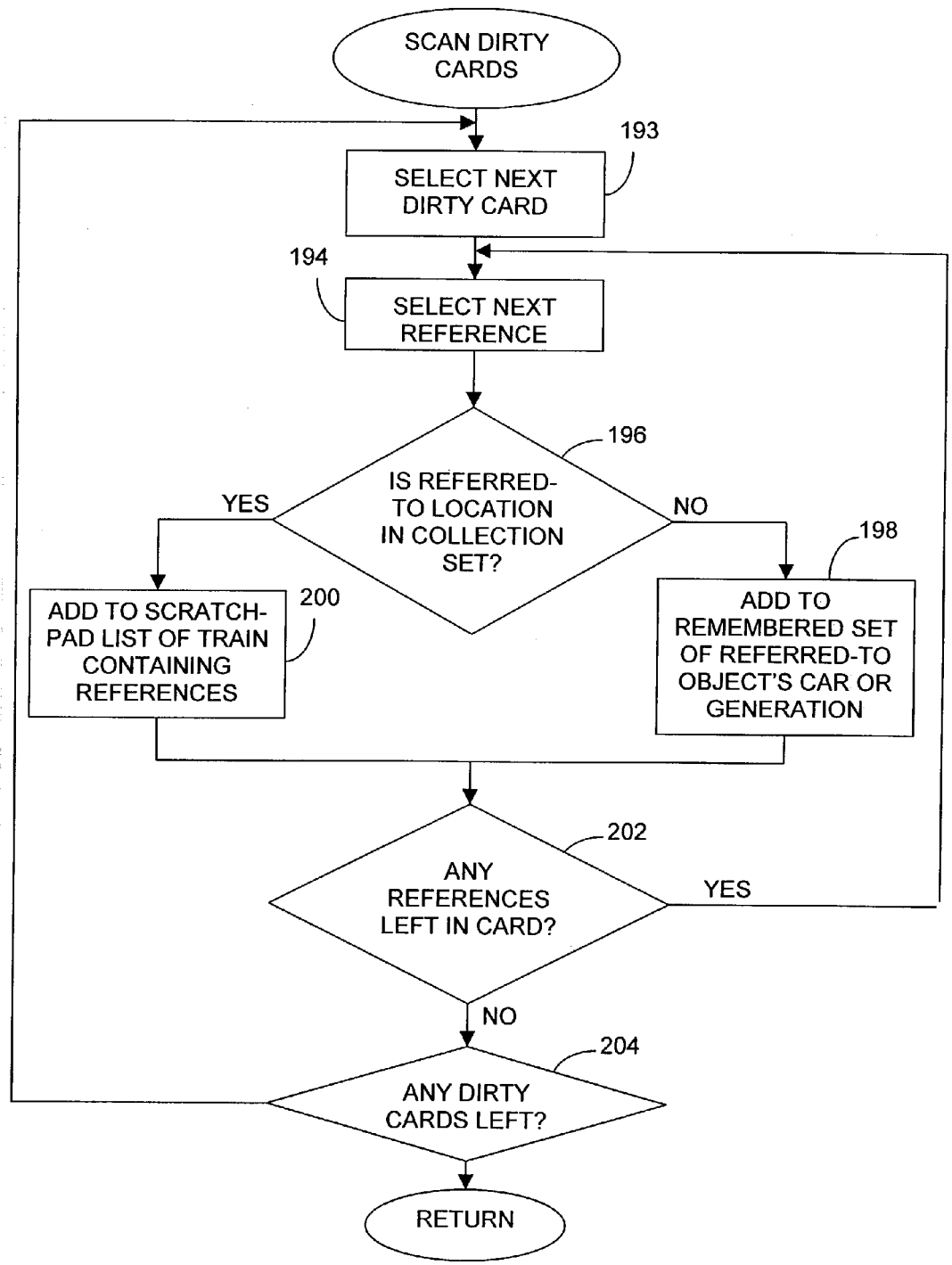
FIG. 15 is a flow chart of a routine used by that embodiment for processing cards that contain modified references.

So I update remembered sets in such a way as to avoid these costs. FIG. 15 depicts a way of doing so. The routine it illustrates can be employed to perform FIG. 13's block-176 operation of scanning dirtied cards and recording thereby-found references against the cars (or, as we shall, against the collection set) into which they refer.

Block 193 represents selecting the next (initially, the first) card that the card table identifies as containing a reference modified since the last collection interval. The collector selects the next (initially, the first) reference in that card, as block 194 indicates., As block 196 indicates, it then determines whether the location to which the reference refers is located in the collection set.

If it is not, the collector records the reference's location in the normal way, as block 198 indicates. In the case of a reference to a non-collection-set location in the old generation, the collector records the reference's location against the referred-to location by entering an identifier of the reference's location in the remembered set associated with the referred-to location's car. In the case of a reference that refers to a location in the young generation, the reference's location may be recorded against the young generation as a whole by, for instance, making an appropriate entry in an expanded version of the card table.

As block 200 indicates, though, the reference-recording operation is different if the referred-to location is in the collection set. Instead of recording the reference's location against the car into which it refers, the collector records it against the collection set as a whole by making an entry in one of the scratch-pad lists. For references to collection-set locations, that is, the collector bypasses the step of recording the references in the per-car remembered sets; it records each directly in the constituent scratch-pad list associated with the train to which the car containing the reference belongs.

As blocks 202 and 204 indicate, the collector performs this reference-recording operation for all references in all dirty cars.

We now return to the scratch-pad-list-building routine of FIG. 14 to see the result of thus bypassing the remembered sets when the references refer to collection-set locations. When the collector enters that routine at the beginning of a collection increment's second or subsequent interval, the "next" remembered-set entry to which block 182 refers at the start of the routine need not be the one in the first remembered-set slot. Since the collection set's remembered set has been bypassed, its contents have not changed since the previous interval, so the collector does not need to re-scan previously processed remembered-set slots. It can instead begin where the previous interval left off. Moreover, it does not need to leave NULL values in the remembered-set slots that it does process.

Independently of whether the scratch-pad-list-building operation represented by FIG. 13's block 180 takes one collection interval or more than one, it will eventually be finished: the test represented by FIG. 13's block 190 will yield an affirmative result. When that happens, it is time to evacuate any reachable objects from the collection set. Now, evacuation differs from culling stale entries in that it does not lend itself as readily to multiple-interval performance; what scratch-pad-list-building does is segregate an operation that can be readily performed over multiple intervals from one that cannot. And, as was mentioned above, the collection-set size will have been so selected as ordinarily to permit all of FIG. 13's collection operations to be performed in a single collection interval. So, if the scratch-pad-list-building is completed early enough in a given interval, enough time should remain for all of the collection increment's remaining operations to be completed.

But the scratch-pad-list-building operation will sometimes end relatively late in a collection interval, when not enough time remains for the evacuation to be completed without exceeding pause-time limits. To avoid the difficulty of breaking up the evacuation operation, the collector performs a test represented by block 208, in which it determines whether enough time remains for an evacuation to be completed in that same interval. The specific mechanism by which the collector makes that determination is not important here. It may simply use a hard-coded estimate of the maximum amount of time required for evacuation in order to make this determination. Or it may use an estimate derived from various run-time-condition measurements it makes. In any event, it terminates the collection interval if it determines that not enough time remains to perform the entire evacuation operation without exceeding pause-time limits.

Figure 9:
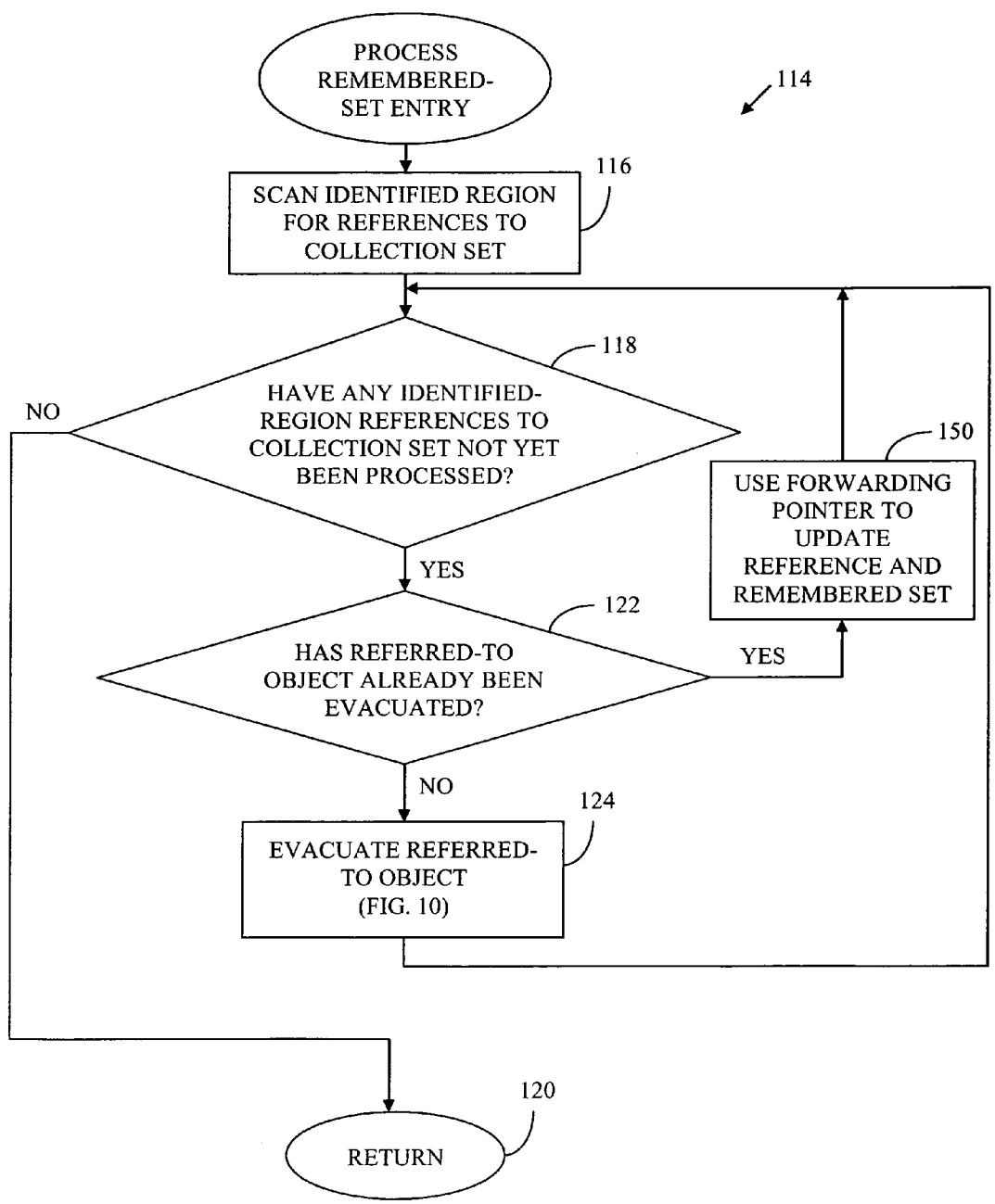
FIG. 9, discussed above, is a flow chart that illustrates in more detail the remembered-set processing included in FIG. 8A.
Figure 10:
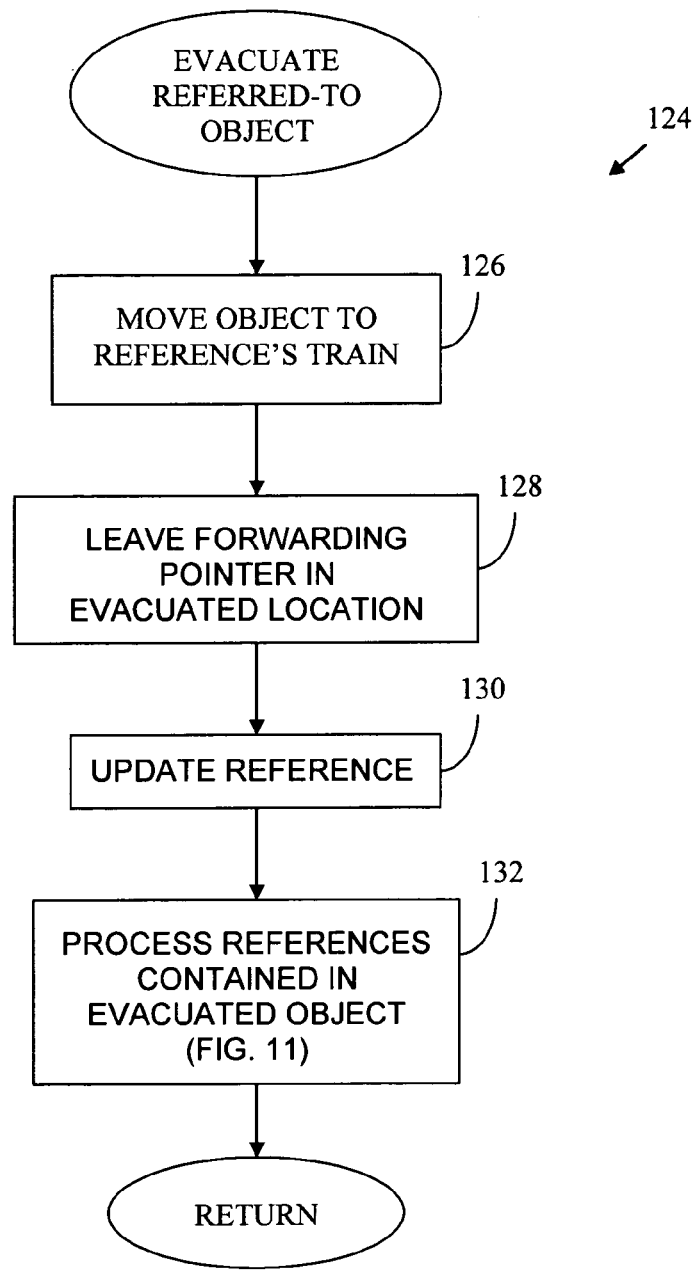
FIG. 10, discussed above, is a block diagram that illustrates in more detail the referred-to-object evacuation that FIG. 9 includes.
Figure 11A:
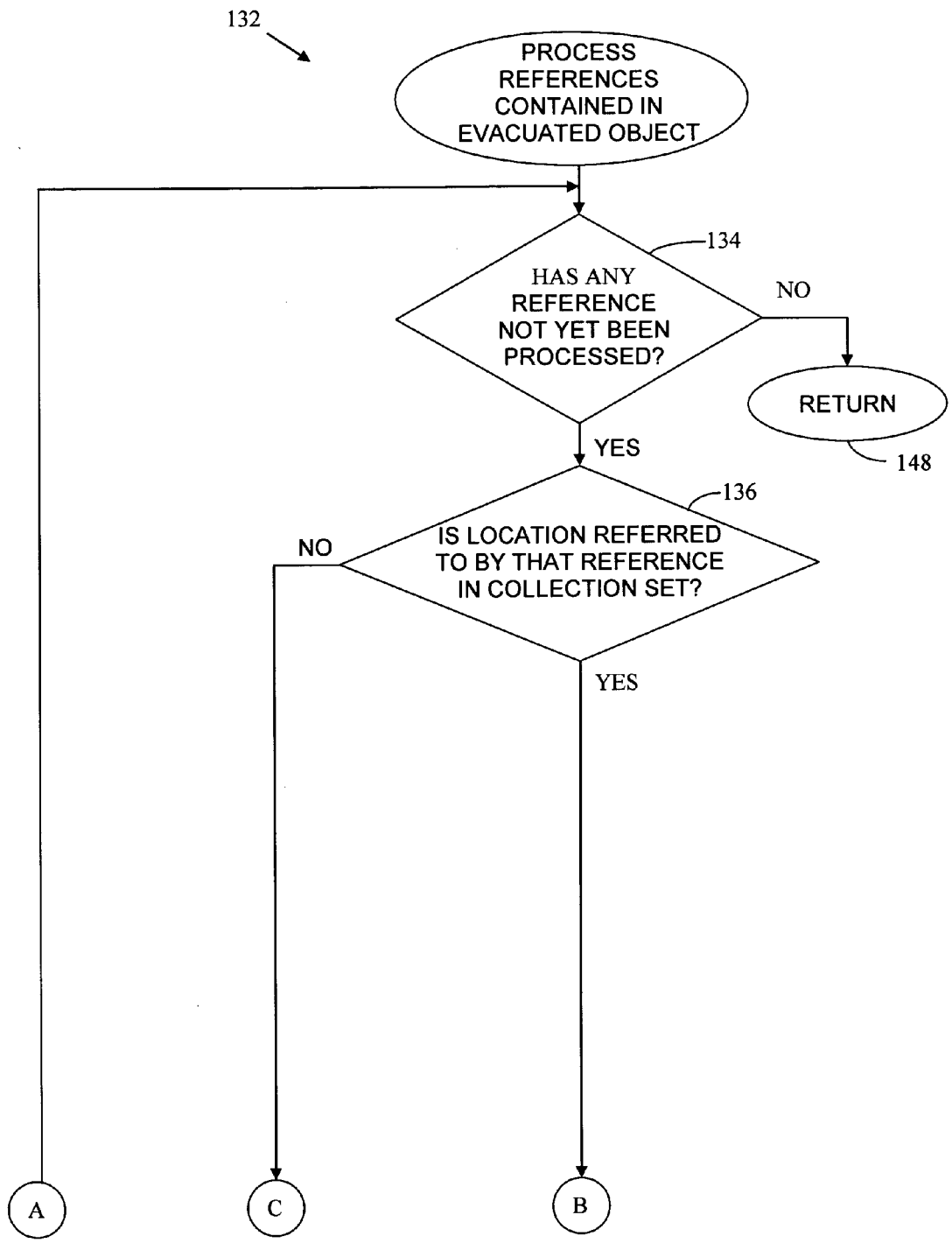
FIGS. 11A and 11B, discussed above, together form a flow chart that illustrates in more detail the FIG. 10 flow chart's step of processing evacuated objects' references.
Figure 11B:
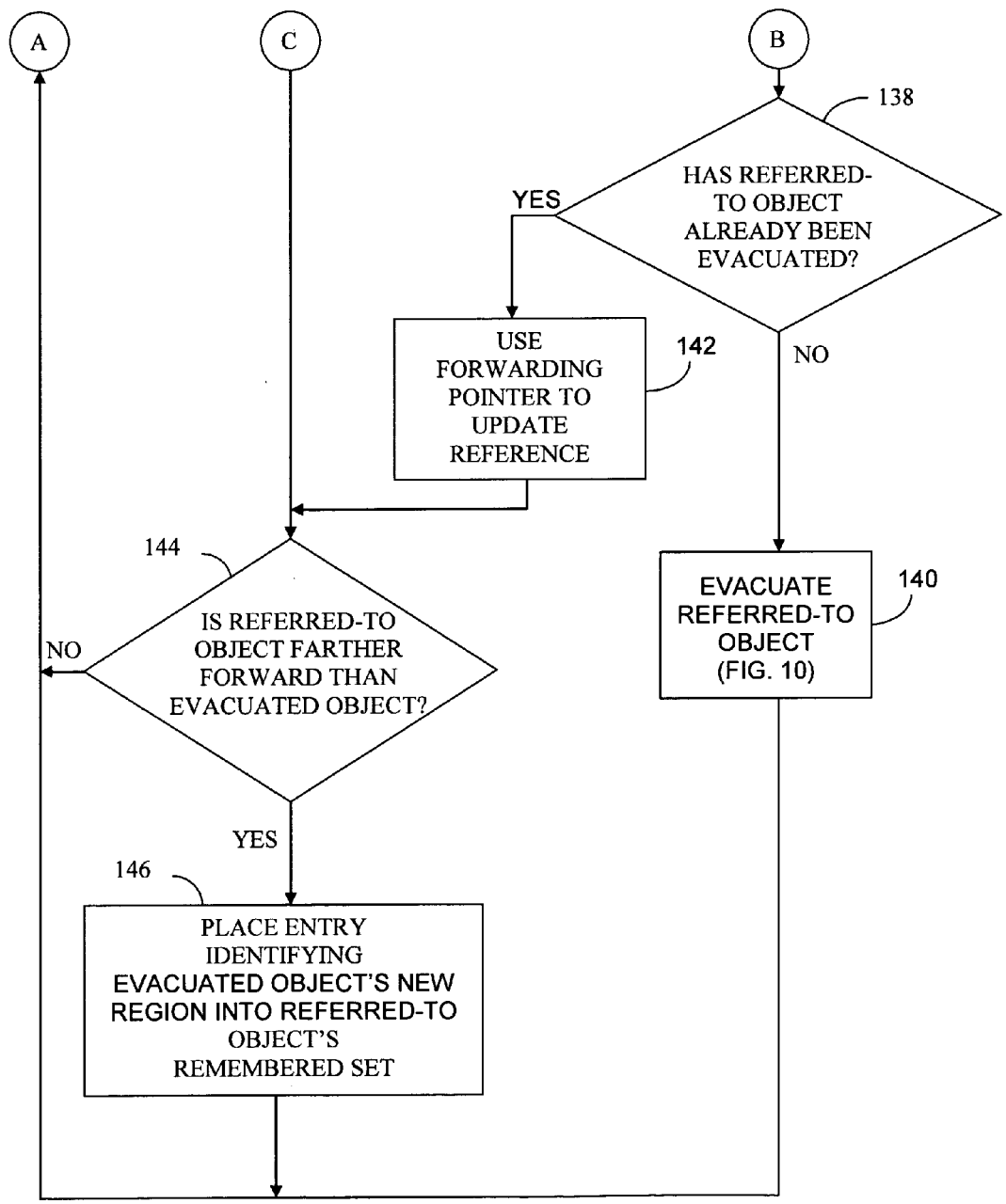
Figure 12A:
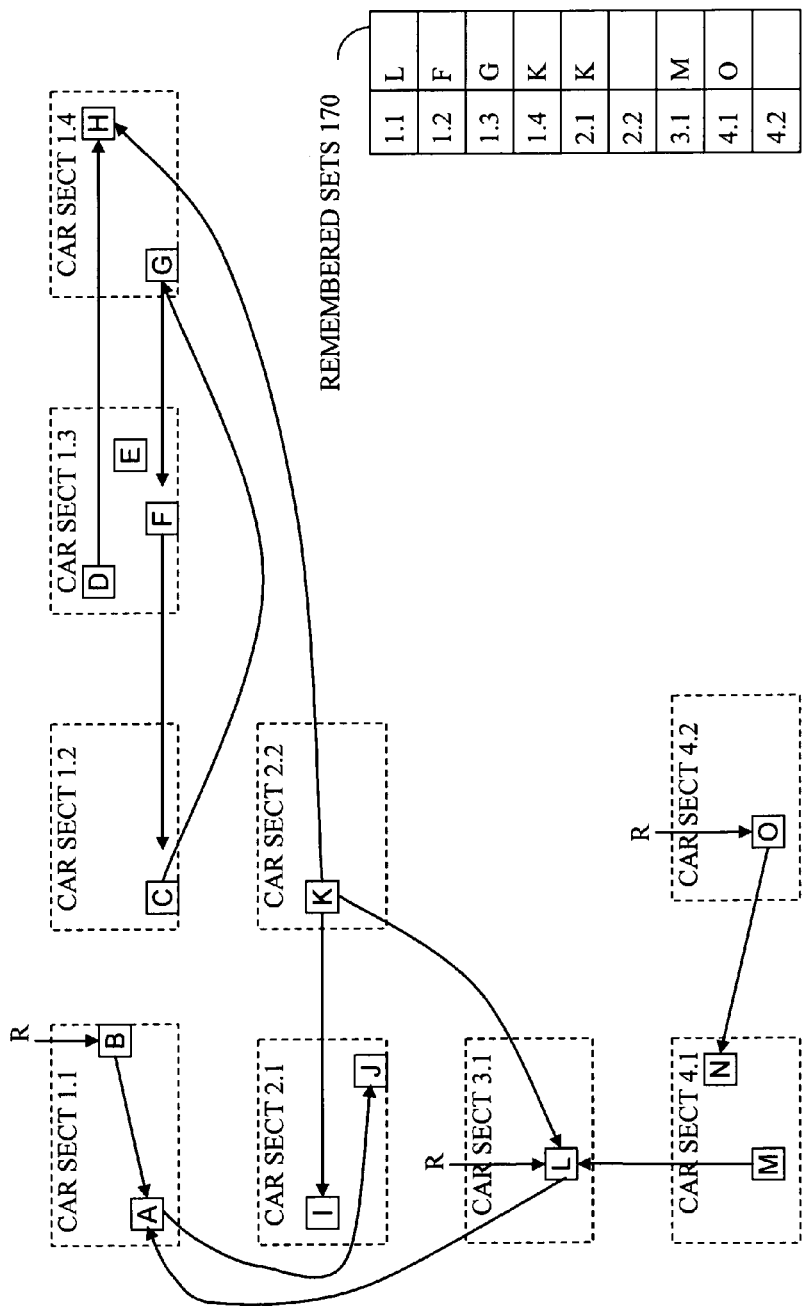
Figure 12B:
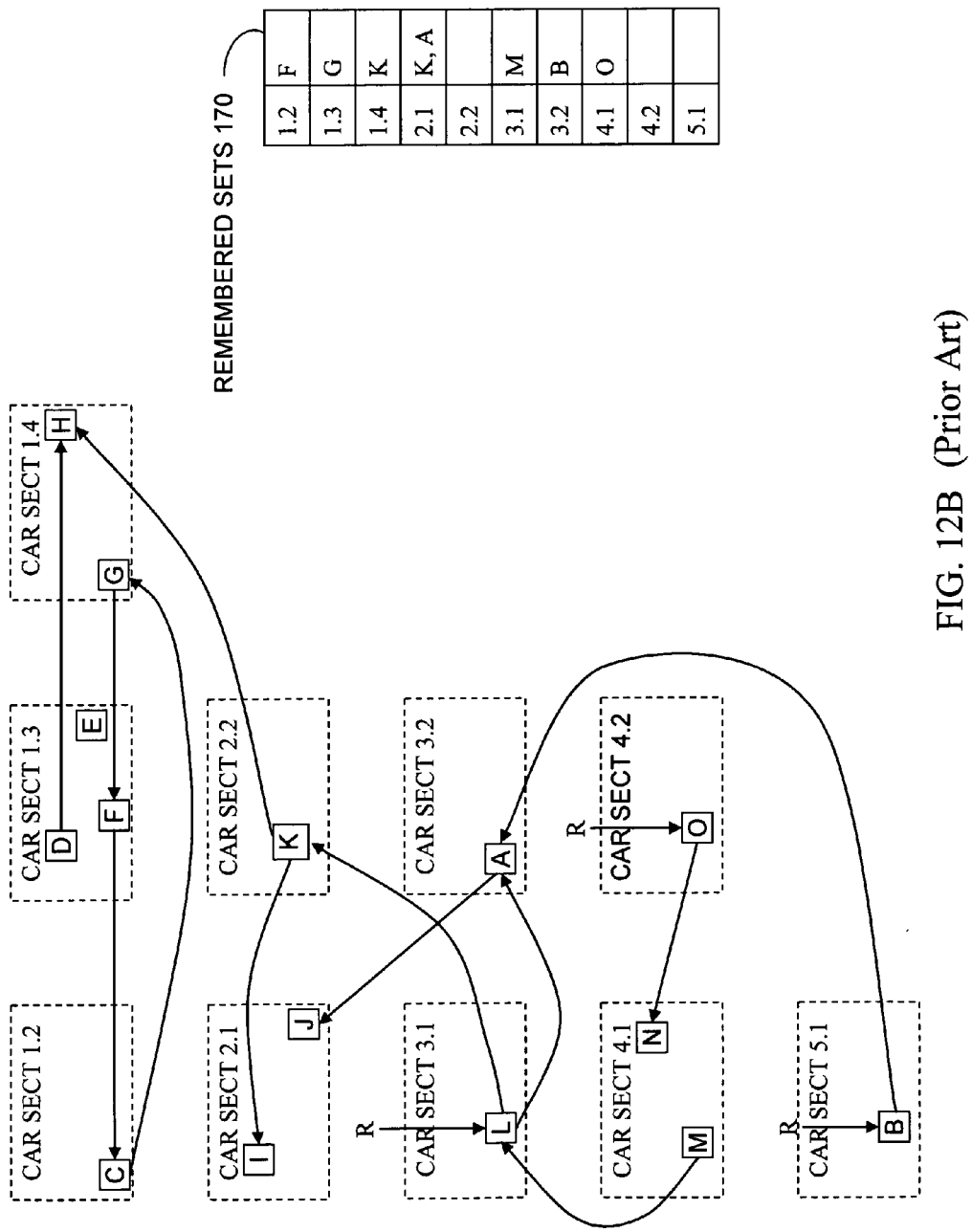
Figure 12C:
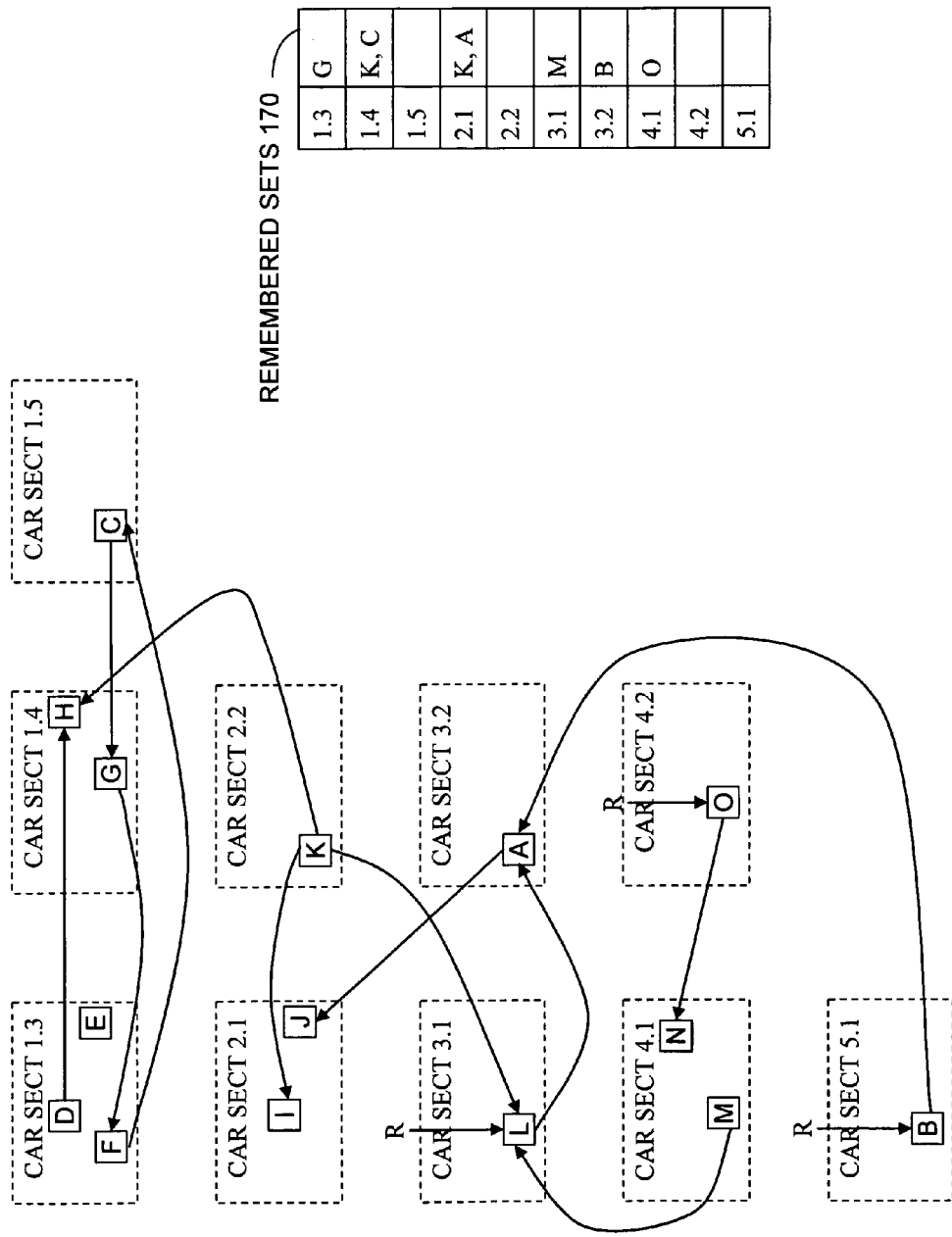
Figure 12D:
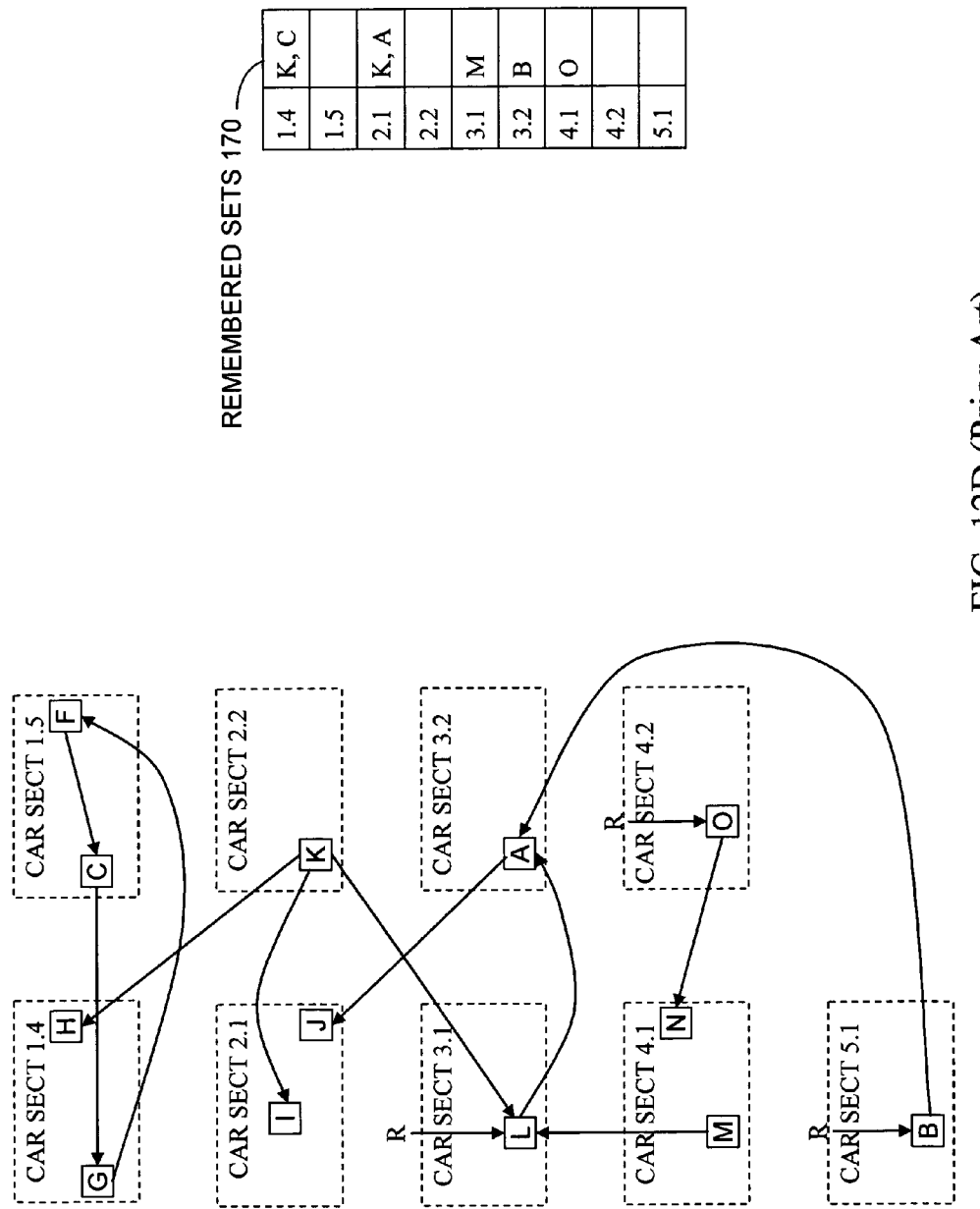
Figure 12E:
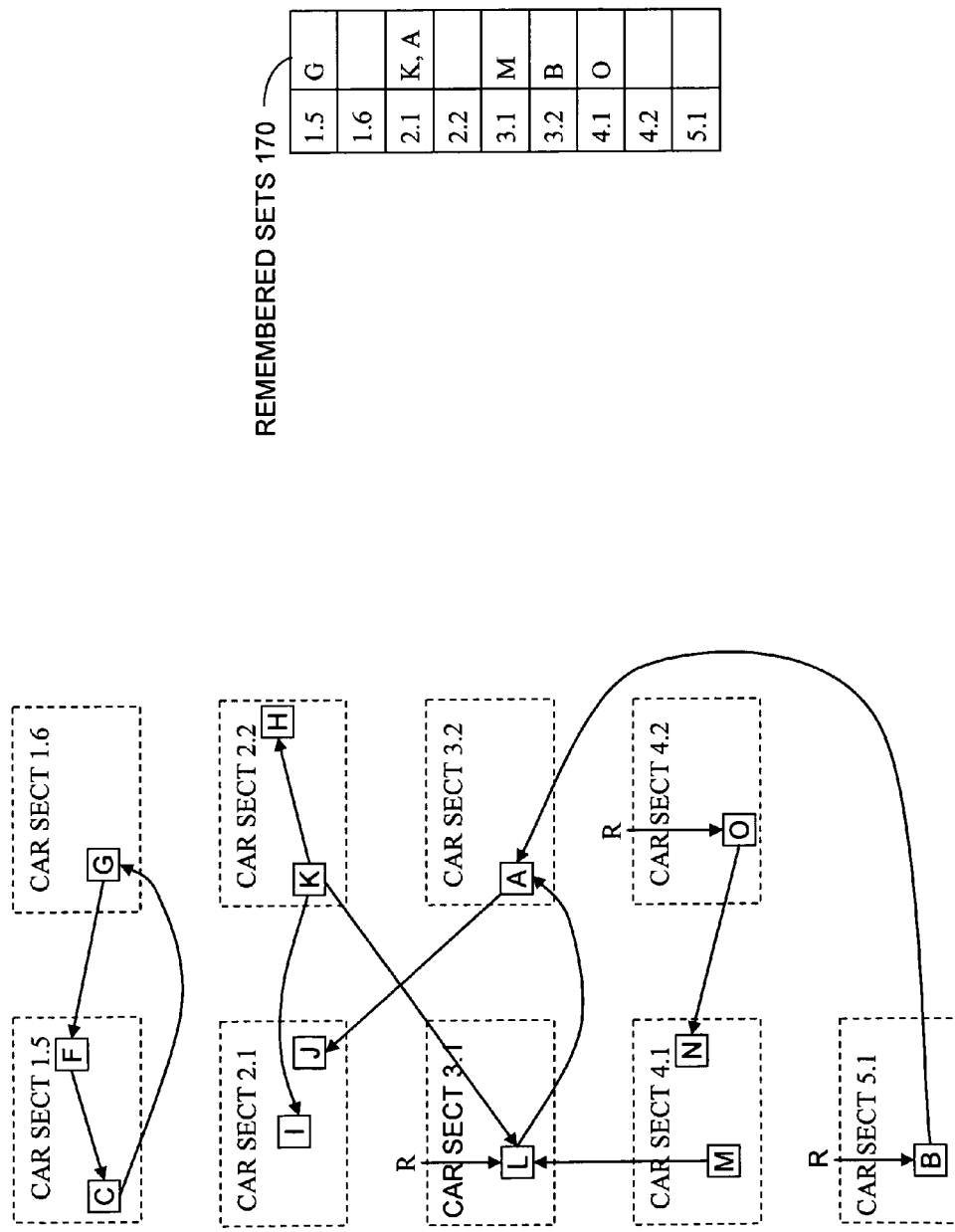
Figure 12F:
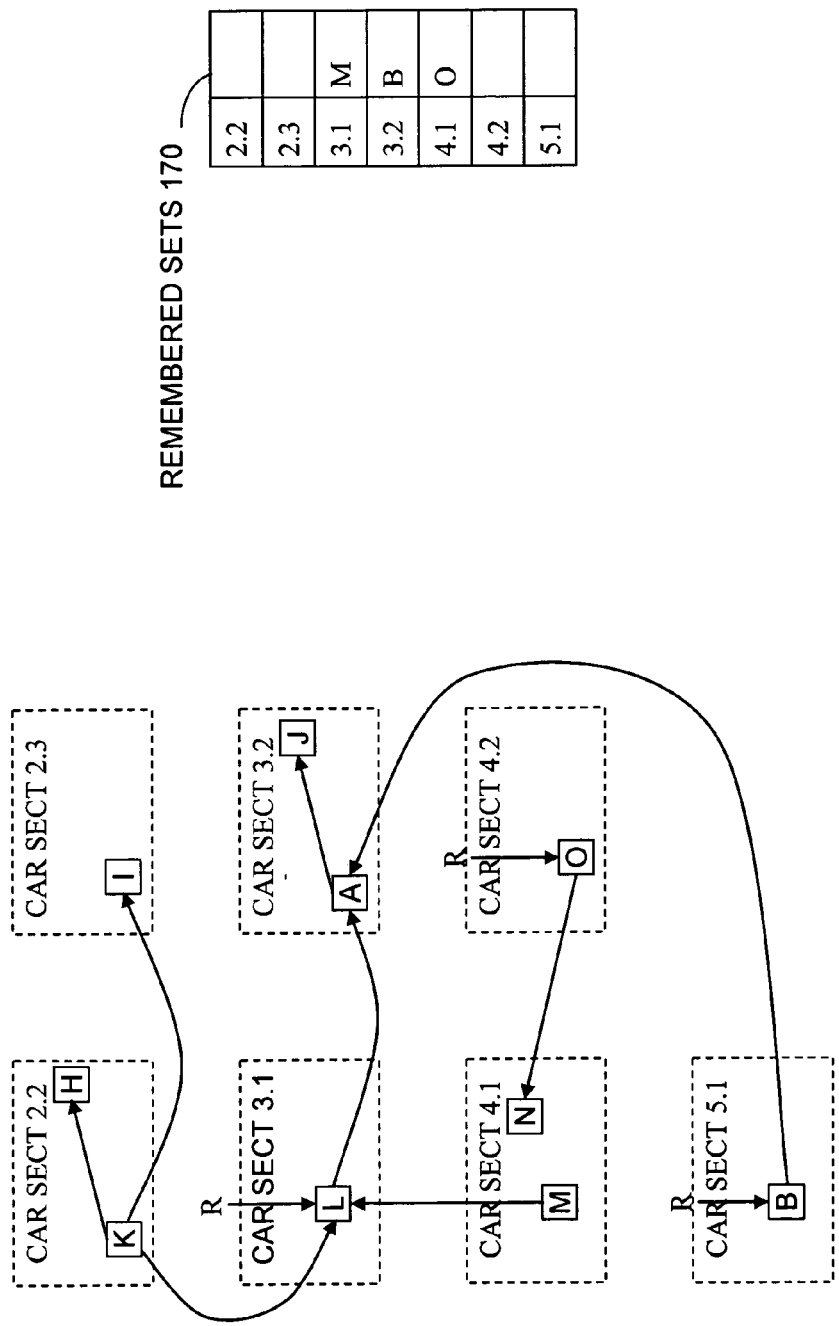

Otherwise, the collector proceeds to perform the evacuation process with the aid of the scratch-pad lists. As will be seen, using the scratch-pad lists rather than performing the reachable-object-identification operations directly from the remembered sets yields an advantage that would justify employing the scratch-pad lists even in a collector that does not support multiple-interval increments. As FIG. 13's blocks 210, 212, 214, 216, and 218 indicate, the collector processes scratch-pad-list entries, beginning with those in the scratch-pad list associated with the youngest train and proceeding through successively older trains to the second-oldest train. The scratch-pad-list processing represented by block 214 is essentially the same as the remembered-set processing described above in connection with FIG. 9, although the formats of the scratch-pad-list entries will typically differ from those of remembered-set entries, and the granularities that scratch-pad-list entries represent may differ from remembered-set-entry granularities.

But this reverse-train-order processing of scratch-pad-list entries is more efficient than conventional remembered-set-entry processing, since it reduces the average number of times an object is evacuated. To appreciate this, consider a collection-set object that is referred to by two references, one of which is located in a relatively young train and another of which is located in a relatively old train. If evacuation is performed directly from the remembered sets, the referred-to object could be evacuated to the relatively old train rather than to the relatively young train. This would be disadvantageous, because, when the car to which it is thus evacuated comes up for collection, the referred-to object will probably need to be evacuated again, to a car in the relatively young train. By employing the per-train scratch-pad lists and processing them in reverse-train order, the illustrated embodiment eliminates the extra evacuation and thereby makes collection more efficient. So the scratch-pad-list-building operation, by which the illustrated embodiment separates the entry-culling operation from the evacuation operation, adds no overhead; indeed, it contributes to efficiency even when an increment is not divided among multiple intervals.

We digress at this point to make a couple of observations concerning the scratch-pad lists that result. The first is that the scratch-pad lists themselves are not always free of stale entries. It is true that the only remembered-set entries from which scratch-pad-list entries are generated are those that are not stale. Since the scratch-pad-list generation is divided among multiple intervals, though, scratch-pad-list entries can be made stale by intervening mutator activity. But this effect is minor, because the amount of mutator activity involved is quite small, being restricted to that which occurs between the few successive intervals of only a single collection increment. In contrast, the amount of mutator activity that can make remembered-set entries stale is much greater; not only are successive collection increments usually separated by a relatively large number of intervals that do not belong to old-generation-collection increments, but many increments can occur between a given remembered-set-entry's recording and the time when the associated car comes up for collection.

The other observation concerns another difference between the scratch-pad lists and the structures in which remembered-set entries are recorded. As was mentioned above, remembered-set data structures are typically implemented as hash tables or other mechanisms for avoiding duplicates. This is because it is necessary as a practical manner to avoid duplicate remembered-set entries. Of course, duplication avoidance adds expense to the remembered-set-updating operation, but the cost is more than justified by the savings that results when the associated car section comes up for collection and the remembered set is used to identify reachable objects.

Considerations are different in the case of scratch-pad lists, though. In the first place, most of a scratch-pad list's entries are made in response to remembered-set entries, of which duplications have already been prevented. Additionally, although the possibility of duplication does exist in the case of entries made directly from card-table processing rather than from remembered-set entries, the number of such entries is relatively small, so the additional cost of processing the duplicate entries is, too. Also, duplicate processing results in no inconsistency, since the process is idempotent: the result of processing a reference only once is no different from that of processing it more than once. So the illustrated embodiment takes no steps to avoid duplication in scratch-pad-list entries.

When the scratch-pad lists associated with all trains but the oldest have been processed, the collector then processes references that are located outside the collection set but identify collection-set objects. That is, it evacuates any such objects, typically to cars in a train dedicated to objects thus evacuated during the current increment. FIG. 13's block 220 represents this operation.

In the illustrated embodiment, it is only after that point that the collector makes the determination, represented by block 222, of whether there are any references into the oldest train from outside of it. As before, the collector will reclaim the entire train, as block 224 indicates, if there are no such references. As blocks 226 and 228 indicate, it otherwise processes the entries in the scratch-pad list associated with the oldest train. It then reclaims the collection set, as block 230 indicates, and the collection interval ends.

By employing the present invention's teachings, a collector that employs incremental garbage collection can obtain the efficiency advantages of large collection sets but still impose relatively strict pause-time limits. The present invention therefore constitutes a significant advance in the art.

What is claimed is:

1. A method of garbage collection comprising:
    A) providing a computer system that includes memory and executes a mutator that modifies references in a dynamically allocated heap in the memory;
    B) configuring the computer system to act as a garbage collector that:
        i) treats the heap as comprising at least one generation; and
        ii) collects at least an incrementally collected one said generation in collection increments, the collection of each collection increment being performed without intervening mutator execution and wherein the garbage collector is modified to perform a collection of at least one collection increment in a plurality of collection intervals dedicated to collection and separated by intervals of mutator execution;
        iii) associates with each collection increment a respective collection set collected during that increment;
        iv) maintains for the collection sets respective remembered sets of remembered-set entries that identify locations where references to objects in the respective collection sets have been found before the increments with which those collection sets are associated;
   v) during a collection increment:
      a) performs a reference-listing operation in which, by inspecting the locations identified by the remembered-set entries in the remembered set associated with that increment, it compiles a scratch-pad list of locations where it thereby finds references to objects in the collection set associated with that increment;
      b) performs an evacuation operation in which it evacuates from the collection set objects that it employs the scratch-pad list to identify; and
      c) thereafter reclaims the collection set; and
   vi) in at least some collection increments divides performance of the reference-listing operation among a plurality of the collection intervals; and
C) employing the computer system to execute the garbage collector.

2. A method as defined in claim 1 wherein the collector always performs the entire evacuation operation in a single collection interval.

3. A method as defined in claim 1 wherein:
D) the garbage collector treats the incrementally collected generation as divided into car sections organized into trains; and
E) the scratch-pad list is a composite scratch-pad list that includes a plurality of constituent scratch-pad lists of which each is associated with a respective train and lists locations in car sections belonging to the train with which it is associated.

4. A method as defined in claim 1 wherein:
D) the garbage collector treats the incrementally collected generation as divided into car sections;
E) the garbage collector maintains for each car section a respective remembered set, associated therewith, of remembered-set entries that identify locations where references to objects in the that car section have been found; and
F) the remembered set associated with a collection set includes each remembered set associated with a car section included in that collection set.

5. A method as defined in claim 4 wherein:
G) the mutator employs write barriers to report to the garbage collector where reference modifications have been made; and
H) the garbage collector responds to the write barriers by inspecting the locations reported thereby and, for each reference thereby found to an object located in the generation:
   i) if that object does belong to the collection set, places into the remembered set associated with the car containing that object a remembered-set entry that identifies that reference's location; and
   ii) if that object does belong to the collection set, refrains from placing an entry identifying it into a remembered and instead places into the scratch-pad list a scratch-pad-list entry that identifies that reference's location.

6. A method as defined in claim 5 wherein the collector always performs the entire evacuation operation in a single collection interval.

7. A method as defined in claim 1 wherein:
D) in at least some collection increments, the garbage collector:
   i) performs an evacuation operation, in which it evacuates from the collection set objects that it identifies as potentially reachable; and
   ii) thereafter reclaims the collection set; and
E) the garbage collector always performs the entire evacuation operation in a single collection interval.

8. A computer system comprising:
A) processor circuitry operable to execute processor instructions; and
B) memory circuitry, to which the processor circuitry is responsive, that includes a heap comprising at least one generation in which memory space is dynamically allocated and that contains processor instructions readable by the processor circuitry to configure the computer system as a mutator that modifies references in the heap and as a garbage collector that:
   i) treats the heap as comprising at least one generation; and
   ii) collects at least an incrementally collected one said generation in collection increments, the collection of each collection increment being performed without intervening mutator execution and wherein the garbage collector is modified to perform a collection of at least one collection increment in a plurality of collection intervals dedicated to collection and separated by intervals of mutator execution;
   iii) associates with each collection increment a respective collection set collected during that increment;
   iv) maintains for the collection sets respective remembered sets of remembered-set entries that identify locations where references to objects in the respective collection sets have been found before the increments with which those collection sets are associated;
   v) during a collection increment:
      a) performs a reference-listing operation in which, by inspecting the locations identified by the remembered-set entries in the remembered set associated with that increment, it compiles a scratch-pad list of locations where it thereby finds references to objects in the collection set associated with that increment;
      d) performs an evacuation operation in which it evacuates from the collection set objects that it employs the scratch-pad list to identify; and
      c) thereafter reclaims the collection set; and
   vi) in at least some collection increments divides performance of the reference-listing operation among a plurality of the collection intervals; and
C) employing the computer system to execute the garbage collector.

9. A computer system as defined in claim 8 wherein the collector always performs the entire evacuation operation in a single collection interval.

10. A computer system as defined in claim 8 wherein:
D) the garbage collector treats the incrementally collected generation as divided into car sections organized into trains; and
E) the scratch-pad list is a composite scratch-pad list that includes a plurality of constituent scratch-pad lists of which each is associated with a respective train and lists locations in car sections belonging to the train with which it is associated.

11. A computer system as defined in claim 8 wherein:
D) the garbage collector treats the incrementally collected generation as divided into car sections;
E) the garbage collector maintains for each car section a respective remembered set, associated therewith, of remembered-set entries that identify locations where references to objects in the that car section have been found; and
F) the remembered set associated with a collection set includes each remembered set associated with a car section included in that collection set.

12. A computer system as defined in claim 11 wherein:
G) the mutator employs write barriers to report to the garbage collector where reference modifications have been made; and
H) the garbage collector responds to the write barriers by inspecting the locations reported thereby and, for each reference thereby found to an object located in the generation:
   i) if that object does belong to the collection set, places into the remembered set associated with the car containing that object a remembered-set entry that identifies that reference's location; and
   ii) if that object does belong to the collection set, refrains from placing an entry identifying it into a remembered and instead places into the scratch-pad list a scratch-pad-list entry that identifies that reference's location.

13. A computer system as defined in claim 12 wherein the collector always performs the entire evacuation operation in a single collection interval.

14. A computer system as defined in claim 8 wherein:
D) in at least some collection increments, the garbage collector:
   i) performs an evacuation operation, in which it evacuates from the collection set objects that it identifies as potentially reachable; and
   ii) thereafter reclaims the collection set; and
E) the garbage collector always performs the entire evacuation operation in a single collection interval.

15. A storage medium containing instructions readable, by a computer system that includes memory including a heap in which space is dynamically allocated to a mutator that modifies references therein, to configure the computer system to operate as a garbage collector that:
A) treats the heap as comprising at least one generation;
B) collects at least an incrementally collected one said generation in collection increments, the collection of each collection increment being performed without intervening mutator execution and wherein the garbage collector is modified to perform a collection of at least one collection increment in a plurality of collection intervals dedicated to collection and separated by intervals of mutator execution;
C) associates with each collection increment a respective collection set collected during that increment;
D) maintains for the collection sets respective remembered sets of remembered-set entries that identify locations where references to objects in the respective collection sets have been found before the increments with which those collection sets are associated;
E) during a collection increment:
   i) performs a reference-listing operation in which, by inspecting the locations identified by the remembered-set entries in the remembered set associated with that increment, it compiles a scratch-pad list of locations where it thereby finds references to objects in the collection set associated with that increment;
   ii) performs an evacuation operation in which it evacuates from the collection set objects that it employs the scratch-pad list to identify; and
   iii) thereafter reclaims the collection set; and
F) in at least some collection increments divides performance of the reference-listing operation among a plurality of the collection intervals.

16. A storage medium as defined in claim 15 wherein the collector always performs the entire evacuation operation in a single collection interval.

17. A storage medium as defined in claim 15 wherein:
G) the garbage collector treats the incrementally collected generation as divided into car sections organized into trains; and
H) the scratch-pad list is a composite scratch-pad list that includes a plurality of constituent scratch-pad lists of which each is associated with a respective train and lists locations in car sections belonging to the train with which it is associated.

18. A storage medium as defined in claim 15 wherein:
G) the garbage collector treats the incrementally collected generation as divided into car sections;
H) the garbage collector maintains for each car section a respective remembered set, associated therewith, of remembered-set entries that identify locations where references to objects in the that car section have been found; and
I) the remembered set associated with a collection set includes each remembered set associated with a car section included in that collection set.

19. A storage medium as defined in claim 18 wherein:
J) the mutator employs write barriers to report to the garbage collector where reference modifications have been made; and
K) the garbage collector responds to the write barriers by inspecting the locations reported thereby and, for each reference thereby found to an object located in the generation:
   i) if that object does belong to the collection set, places into the remembered set associated with the car containing that object a remembered-set entry that identifies that reference's location; and
   ii) if that object does belong to the collection set, refrains from placing an entry identifying it into a remembered and instead places into the scratch-pad list a scratch-pad-list entry that identifies that reference's location.

20. A storage medium as defined in claim 19 wherein the collector always performs the entire evacuation operation in a single collection interval.

21. A storage medium as defined in claim 15 wherein:
G) in at least some collection increments, the garbage collector:
   i) performs an evacuation operation, in which it evacuates from the collection set objects that it identifies as potentially reachable; and
   ii) thereafter reclaims the collection set; and
H) the garbage collector always performs the entire evacuation operation in a single collection interval.

22. For reclaiming memory in a dynamically allocated heap in which a mutator modifies references, a garbage collector comprising:
- A) means for treating the heap as comprising at least one generation;
- B) means for collecting at least an incrementally collected one said generation in collection increments, the collection of each collection increment being performed without intervening mutator execution and wherein the garbage collector is modified to perform a collection of at least one collection increment in a plurality of collection intervals dedicated to collection and separated by intervals of mutator execution;
- C) means for associating with each collection increment a respective collection set collected during that increment;
- D) means for maintaining for the collection sets respective remembered sets of remembered-set entries that identify locations where references to objects in the respective collection sets have been found before the increments with which those collection sets are associated;
- E) means operable during a collection increment;
  - i) for performing a reference-listing operation in which, by inspecting the locations identified by the remembered-set entries in the remembered set associated with that increment, it compiles a scratch-pad list of locations where it thereby finds references to objects in the collection set associated with that increment;
  - ii) for performing an evacuation operation in which it evacuates from the collection set objects that it employs the scratch-pad list to identify; and
  - iii) for thereafter reclaiming the collection set; and
- F) means operable in at least some collection increments for dividing performance of the reference-listing operation among a plurality of the collection intervals.

* * * * *

UNITED STATES PATENT AND TRADEMARK OFFICE
CERTIFICATE OF CORRECTION

PATENT NO.        : 7,146,390 B2                                          Page 1 of 1
APPLICATION NO.  : 10/372905
DATED             : December 5, 2006
INVENTOR(S)       : Alexander T. Garthwaite It is certified that error appears in the above-identified patent and that said Letters Patent is hereby corrected as shown below:

In the Claims:

In claim 8, column 24 (line 26), replace "d)" with --b)--.

Signed and Sealed this

Sixth Day of March, 2007

JON W. DUDAS
*Director of the United States Patent and Trademark Office*